United States Patent [19]

Rhoads

[11] Patent Number: 4,734,844

[45] Date of Patent: Mar. 29, 1988

[54] MASTER/SLAVE CURRENT SHARING, PWM POWER SUPPLY

[75] Inventor: Paul M. Rhoads, Orlando, Fla.

[73] Assignee: NCR Corporation, Dayton, Ohio

[21] Appl. No.: 59,071

[22] Filed: Jun. 8, 1987

[51] Int. Cl.$^4$ ............................................. H02M 7/00
[52] U.S. Cl. ...................................... 363/72; 363/65; 323/272
[58] Field of Search ........................ 363/26, 65, 67, 71, 363/72; 307/58, 82; 323/269, 272

[56] References Cited

U.S. PATENT DOCUMENTS

| | | | |
|---|---|---|---|
| 4,174,534 | 11/1979 | Kotlarewsky | 363/72 |
| 4,177,389 | 12/1979 | Schott | 363/70 |
| 4,194,147 | 3/1980 | Payne et al. | 323/272 |
| 4,222,098 | 9/1980 | Nagano | 363/71 |
| 4,270,165 | 5/1981 | Carpenter et al. | 363/65 |

Primary Examiner—Patrick R. Salce
Assistant Examiner—Judson H. Jones
Attorney, Agent, or Firm—Wilbert Hawk, Jr.; Edward Dugas; Jack R. Penrod

[57] ABSTRACT

Each power supply of a number of power supplies equally shares the current load supplied by the respective parallel voltage outputs of the supplies. Each power supply is identical to the others and each has the capability to operate as a stand-alone power supply, a master of a master/slave combination, or a slave of a master/slave combination. The determining factor of whether a unit is a master or a slave of a master/slave(s) combination is a single two conductor cable which has the master connection at one end and the slave connector(s) at the remaining end(s). Whichever of the otherwise identical units that the master connection is connected to will be the master unit and whichever of the units are connected to the slave connection(s) will be the slave unit(s). Thus a simple, inexpensive, interchangeable master or slave capability is provided with units which are controlled by the master to equally share the current load.

7 Claims, 26 Drawing Figures

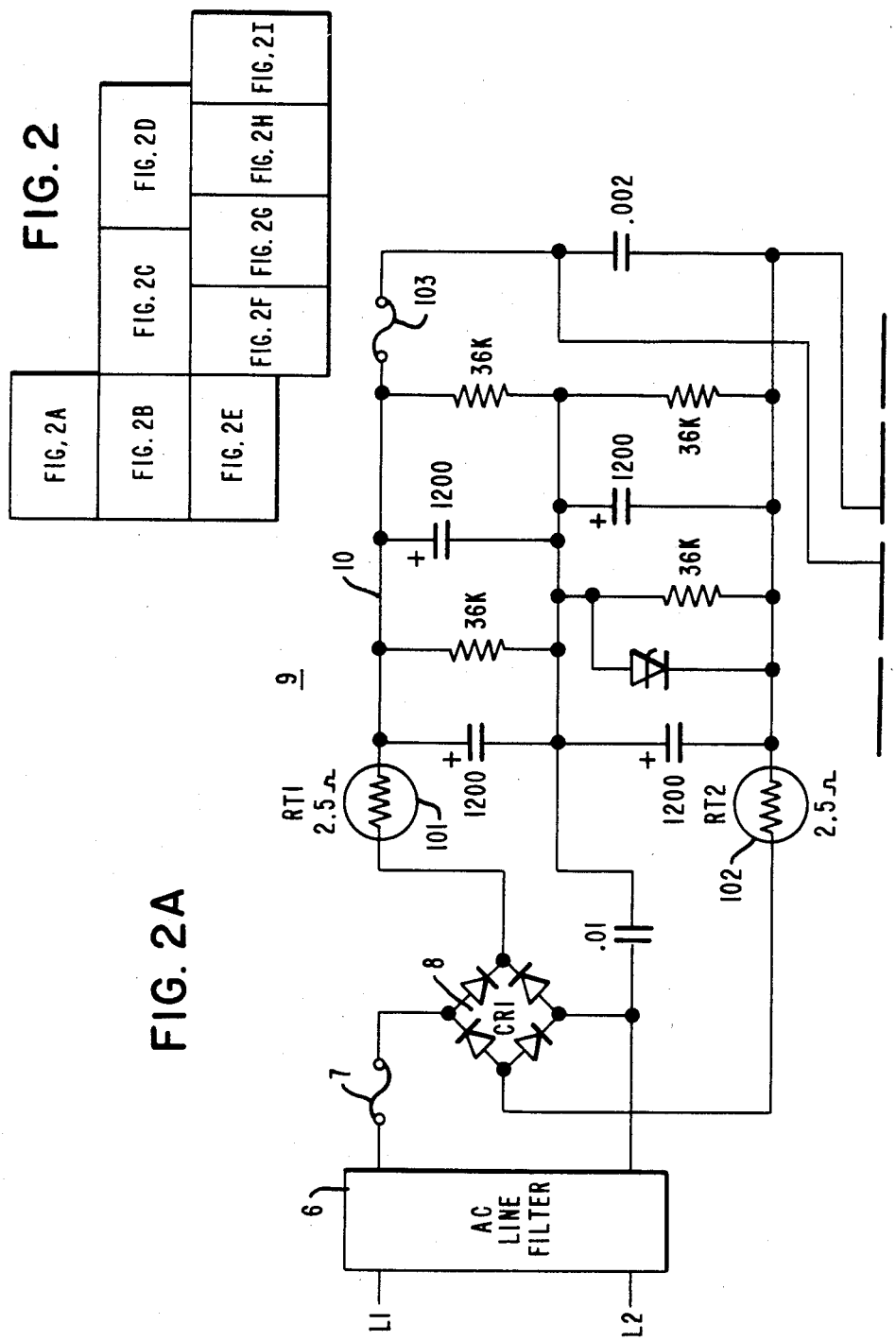

MASTER/SLAVE CURRENT SHARING, PWM POWER SUPPLY

FIELD OF THE INVENTION

The present invention is directed to electrical power supplies and more particularly to parallel switching mode power supplies of the PWM (pulse-width-modulator) type which share an output current load in a master/slave configuration.

BACKGROUND OF THE INVENTION

An important feature of modern electronic systems is the ability to adapt to evolving technologies and growth requirements. Electronic systems which are unable to adapt run the risk of becoming obsolete. Thus, the electronic designer should anticipate growth and provide a flexible architecture allowing for future growth.

An important component of every electronic system is the power supply. If the power supply is not expandable then system growth is either impossible or includes the task of replacing the original power supply with one capable of handling larger power demands. Two standard methods of furnishing a power supply that is expandable are: providing a power supply that has large unused capacity, and providing a power supply which can be inexpensively enlarged to meet future requirements. The latter of the two possibilities is more desirable because the system purchaser does not pay for the extra capacity until it is used.

One approach to the enlargeable power supply problem has been to provide a number of power supplies with paralleled outputs, as in U.S. Pat. Nos. 4,177,389 issued Dec. 4, 1979, and 4,174,534 issued Nov. 13, 1979. Both of these patents involve the paralleling of two substantially identical power supply units to achieve current levels exceeding the capability of a single unit. Substantially similar units provide the system purchaser with the benefits of interchangeability, which tend to reduce cost for expansion units, as well as, increase availability for maintenance and replacement units. However, when two or more interchangeable units which are each capable of independent output control and regulation are paralleled, a problem occurs with regard to the control of the units for sharing the output current load.

In U.S. Pat. No. 4,177,389, the interconnection and control allocation is more complex than necessary for just current sharing units. This is because the patent also encompasses an "on-line" redundancy in which either power supply can assume the voltage and current requirements of the entire system in the event of a fault in one of the paralleled units. In the above identified patent, each power supply has a monitoring circuit which will switch over control to itself in the event of a fault in the paralleled, redundant supply. Recognizing the current sharing problem, the U.S. Pat. No. 4,177,389 provides for the comparison of the average D.C. current of the voltage regulation (i.e., master) unit with the average D.C. current into the current regulated (i.e., slave) unit, and utilizes PWM (pulse-width-modulator) controlled circuitry to minimize the difference of these two currents. The apparatus of this patent addresses the danger of positive feedback between the master and slave units with a current control circuit which is considerably delayed by D.C. filtering, and PWM control circuits which are deliberately operated out of synchronization with each other. Such a design does not truly share the load current. Since the frequency and duration of current from each unit is supplied asynchronously, at any one time, instead of a 50%-50% load current sharing, there can be a 60%-40% or even more unbalanced division of the load current during steady state load conditions. Further, non-steady state load conditions, because of the delay times built into the control circuitry, will lead to even greater instantaneous unbalanced load current division conditions. Thus, in applications where "on-line" redundancy is not required, it is desirable from cost and complexity aspects to provide a simpler circuit with more equal current sharing as the solution to the problem of controlling paralleled power supply units.

A less complex design for solving the current sharing problem when paralleling two power supplies is the non-redundant master/slave arrangement in which one interchangeable unit is assigned the duties of controlling its own outputs as well as the outputs of a slave unit. For interchangeable units, this requires the inclusion of control outputs allowing each the capability to act as a master, as well as, control inputs allowing each unit the capability of acting as a slave. Further, when the control signals of the master unit are connected to the slave unit, provision also must be made that the slave unit's own control signals are either disconnected or are overridden by the master control signals. An example of a known master/slave power supply is shown in FIG. 3 of U.S. Pat. No. 4,174,534, in which unit 65b is the master and unit 65a is the slave. Each unit has a double-pole, single-throw switch 66, 67 which is open if the unit is to be the slave which is controlled by the master unit, or closed if the unit is to be the master unit which provides the control.

The circuit of this non-redundant master/slave power supply is still unnecessarily complex in that many components can be eliminated by more effectively utilizing every component. Moreover, the master/slave switches present a problem because both switches could be inadvertently closed, in which case the two control circuits would both be constantly trying to control the output, or both switches could be inadvertently opened, in which case the system could be operating in an open loop condition with possible catastrophic consequences. Thus, it is desirable for a master/slave power supply circuit to be only as complex as necessary to perform its function, and also to have control loops that cannot be inadvertently, incorrectly connected.

SUMMARY OF THE INVENTION

Briefly stated, in accordance with one aspect of the invention, the aforementioned problems are solved by providing an apparatus for causing a plurality of switching power supplies of the PWM type to share a current output load by synchronizing the PWM switching control signals including: a first switching power supply having a PWM control circuit, one or more additional switching power supplies each having a PWM control circuit and each substantially identical to the first switching power supply, an output interconnecting device for paralleling an output of the first switching power supply with the corresponding output of each of the additional switching power supplies, a device connecting the first switching power supply to each of the additional switching power supplies for synchronizing each PWM control circuit to the PWM control circuit of the first switching power supply, and a device for reproducing at an output of each additional switching power supply PWM control circuit, a control signal substantially identical to an external output of the first switching power supply PWM control circuit, whereby each of the plurality of switching power supplies supplies an approximately equal share of the output current load.

In accordance with another aspect of the invention, the aforementioned problems are solved by providing a master/slave switching power supply combination including: a first switching power supply, a second switching power supply substantially identical to the first switching power supply, a first PWM control circuit having an output and an output signal controlling the current output of the first switching power supply, a second PWM control circuit having an output and an output signal controlling a current output of the second switching power supply, a first overriding input connected to the first PWM control circuit, a second overriding input connected to the PWM control circuit, a D.C. power output of the first switching power supply connected electrically in parallel with a corresponding D.C. power output of the second switching power supply, and a two-wire cable connecting the PWM control circuit output of one of the switching power supplies to the PWM control circuit overriding input of the other switching power supply forming the master/slave switching power supply combination in which each switching power supply equally shares the current load supplied by the paralleled outputs.

It is an object of this invention to provide switching power supply units which can operate independently and also, by a simple interconnection, can operate in a master/slave relationship.

It is a further object of this invention to provide master/slave switching power supply units which are interchangeable.

It is yet a further object of this invention to provide interchangeable master/slave switching power supply units which provide those functions inexpensively.

BRIEF DESCRIPTION OF THE DRAWINGS

FIGS. 2A–2I, when assembled according to the map of FIG. 2, form a simplified schematic of the pulse-width-modulator and related control circuitry portions of the invention.

DESCRIPTION OF THE PREFERRED EMBODIMENT

Figure 1A:
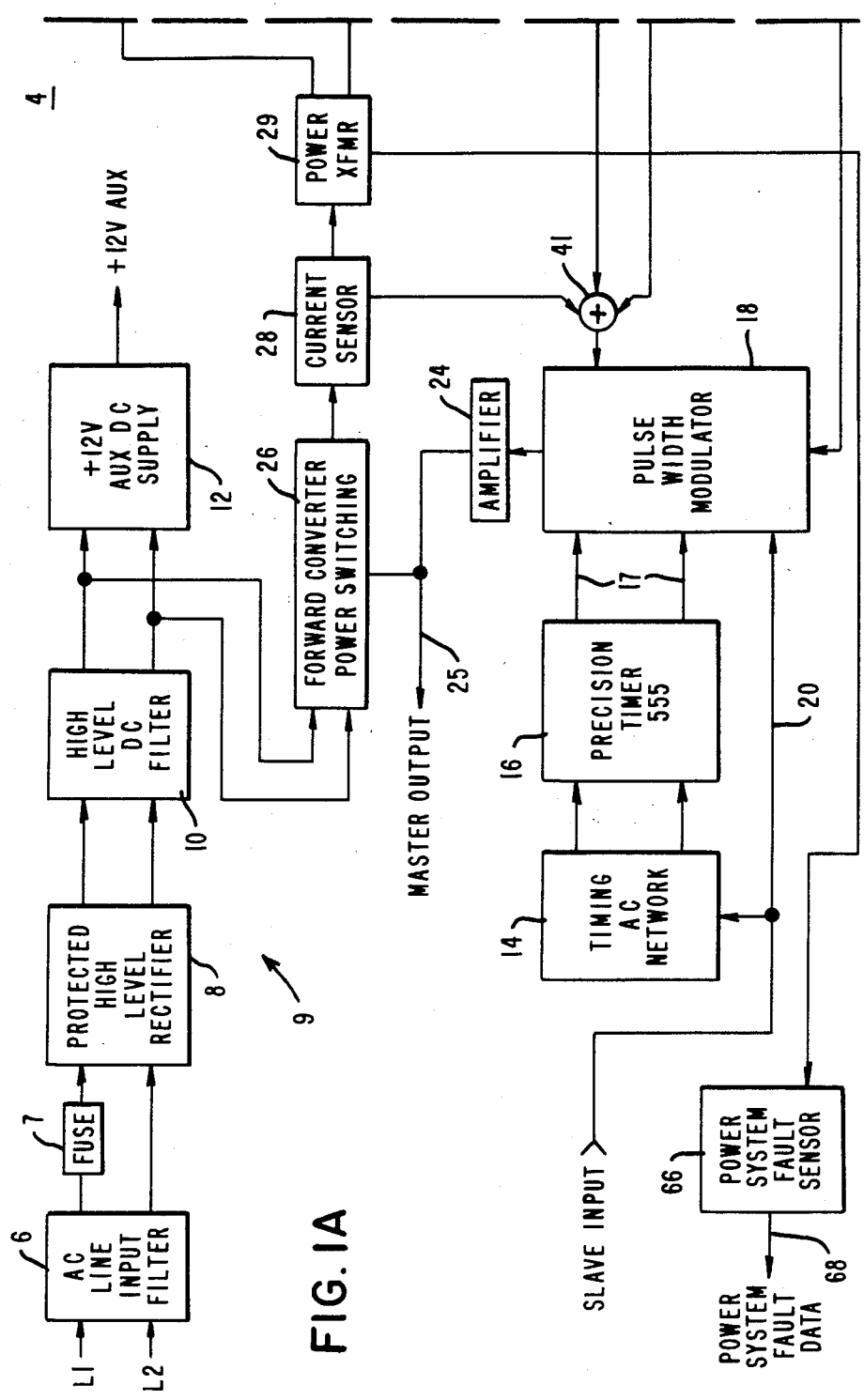
FIGS. 1A and 1B form a block diagram of one PWM power supply which is capable of either independent or master/slave operation.
Figure 1B:
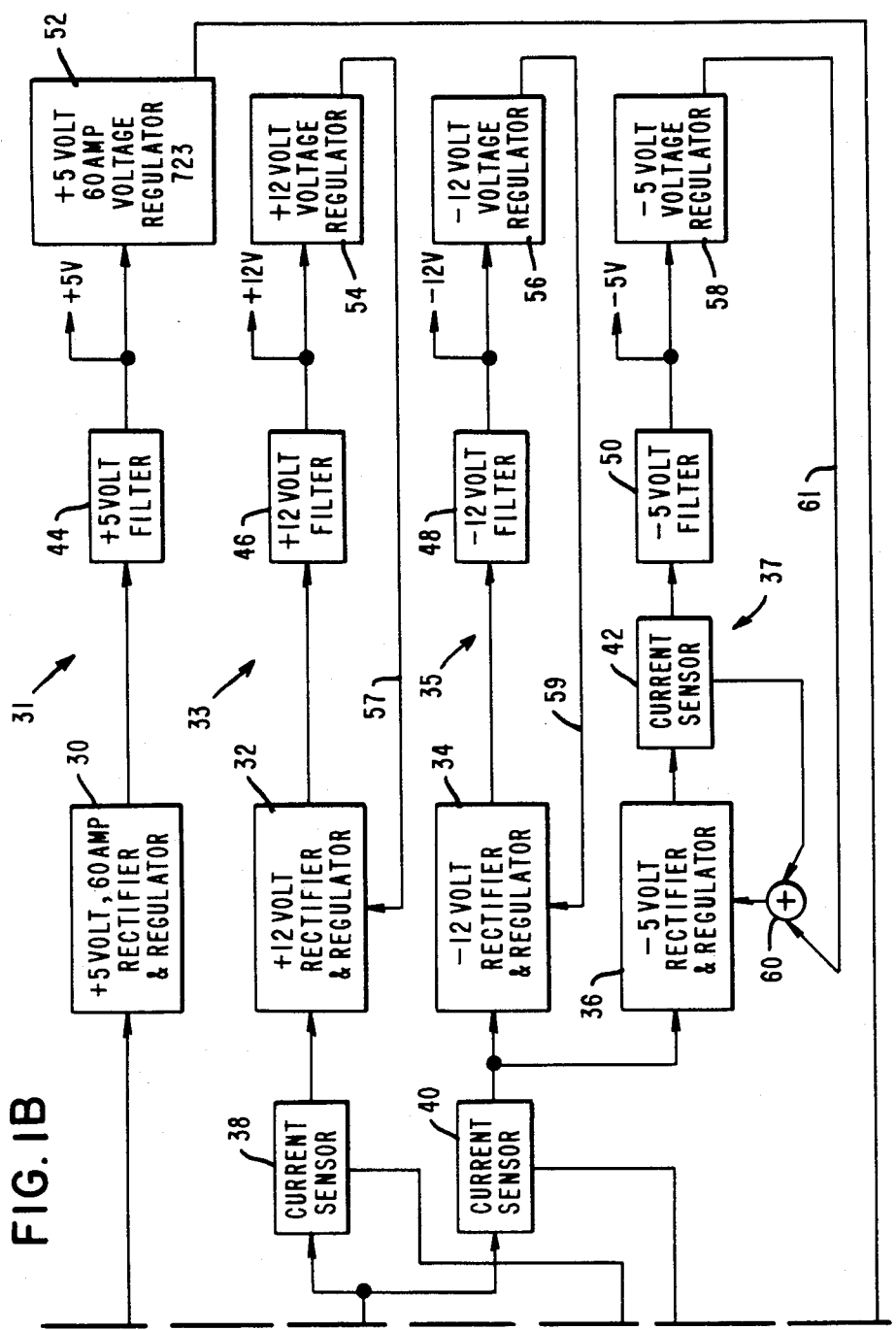

Referring now to FIGS. 1A and 1B, where there is shown a block diagram of a single pulse-width-modulator (PWM) power supply 4, which is capable of operation in a stand-alone mode or a master/slave mode to supply power to an electronic system, such as a computer. Included in the power supply 4 is a high level D.C. supply 9 incorporating an A.C. line input filter 6, through which the A.C. supplied from commercial power lines at L1 and L2 is passed, to remove transients and to prevent them from negatively affecting either the power supply or the attached electronic system. The filtered A.C. power is, thereafter, connected through a protective fuse 7 to a high level rectifier circuit 8, which converts the filtered A.C. power into pulsating, high level D.C. power. This high level D.C. power is smoothed by a high level D.C. filter 10. The rest of the circuitry of the power supply 4 derives its power directly or indirectly from the output of the high level D.C. filter 10.

Connected to the output of the high level D.C. filter is a regulated +12 V auxiliary D.C. supply 12, which reduces the voltage out of high level D.C. filter 10 to the range of +12 to +15 volts for powering the control and drive circuits of the PWM power supply 4. All other internal supply voltages are derived from the +12 v auxiliary D.C. supply 12.

The remainder of the circuitry represented in FIGS. 1A and 1B provides either input control or output control for a switching, forward converter 26. The input control circuitry consists of a timing network 14, a precision timer 16, a pulse-width-modulator (PWM) 18 and a slave input 20. This input circuitry has an internally controlled mode in which the timing network 14 provides a voltage having a known rate of increase to the input of precision timer 16 in order to generate, in a known way, a square-wave at the output of the precision timer 16. The square-wave signal, which has a frequency of approximately 50 kilohertz, is connected through lines 17 to the input of the PWM 18. Initially, the output of the PWM 18 is a modulated square-wave, essentially the same as the output of the precision timer 16, but as soon as a voltage regulator 52 and a main current sensor 28 begin providing feedback inputs to the PWM 18, the pulse-width is modulated, in a known way, to drive the forward converter 26 to deliver the power level represented by the feedback signals from the voltage regulator 52 and the main current sensor 28. This internally controlled mode is the mode of operation used when the power supply is operated as an individual unit or a master unit of a master/slave configuration.

The alternative operation mode is the externally controlled or slave mode of operation. In the slave mode, a pulse train signal is applied to the timing network 14, the precision timer 16, and the PWM 18 by connection with slave input line 20. The slave input pulse train is connected to various inputs of the timing network 14, the precision timer 16, and the pulse-width-modulator 18 in such a manner that the internally generated signals thereof are all but totally overridden by the slave input signal. The output of the PWM 18, in such a case, is virtually identical to the slave input signal on line 20. Thus, the circuitry, as will be discussed in greater detail below, automatically switches to the slave mode when a pulse train of sufficient amplitude appears on line 20. When in the slave mode, the voltage regulator 52 and the main current sensor 28 do not provide regulatory feedback except for the extreme cases of dangerously high over voltage and excessively large over current, respectively.

Since, in the master/slave configuration, the output of the master unit and the slave unit are controlled to be the same, and since within manufacturing tolerances the remainder of the switching power supply circuitry is the same, it can be seen that the current delivered to the load by the master and the slave will be substantially equal.

The remaining description of this specification applies equally to independent operation, master operation or slave operation; except, during slave operation, voltages below the over voltage protection threshold and current below the over current protection threshold are not self-regulating. These signals instead are overridden and regulated by the signal from the master unit.

The output of the PWM 18 is amplified by a driver amplifier 24. At the output of the driver amplifier 24, the master output signal line 25 is connected for delivering this driver amplifier output signal to another externally attached unit for the case of a master/slave interconnection. The driver amplifier 24 also drives the forward converter power switching circuit 26 which inverts the high level D.C. voltage, available at the high level D.C. filter 10, to a controlled pulse train under the control of the PWM 18. The output of the forward converter 26 provides the power for a +5 V, 60 amp power supply 31, a +12 V power supply 33, a −12 V power supply 35, and a −5 V power supply 37. The output of the forward converter 26 is regulated by a main current sensor 28, which is in series with the forward converter 26 output, and provides one of three feedback signals to a current sense input of the PWM 18. The main current sensor 28 in conjunction with the PWM 18 and a power transformer 29 provides, primarily, the current regulation for the +5 V, 60 amp supply 31 since most of the power will ultimately be directed there. The remaining supplies 33, 35 and 37 have post regulator circuits (32, 34 and 36) for regulating their voltages.

The +5 V, 60 amp supply includes a rectifier and regulator 30 and a filter 44. The +5 V, 60 amp output is available at the output of the filter 44 for either a stand-alone unit or a master/slave interconnection. The +5 V, 60 amp output is further sensed by the voltage regulator 52, which provides a regulating feedback signal to the inverting error input of the PWM 18. The PWM 18 will adjust the duty cycle of its output pulse (if not in slave mode) to minimize this error signal from voltage regulator 52. In this way, the +5 V, 60 amp supply 31 is voltage regulated as well as current regulated.

The current from the main current sensor 28 that flows to the +12 V power supply 33 and the −12 V power supply 35 passes through a second current sensor 38 and a third current sensor 40, respectively. The outputs of each current sensor 38, 40 is connected to a summing point 41 where these two signals and the signal from the main current sensor 28 are added together to make up the total signal inputted to the current sense input of the PWM 18. After passing through the current sensors 38 and 40, the current portions go to a +12 V rectifier and regulator 32, and a −12 V rectifier and regulator 34, respectively. The regulation in each of these two supplies is provided by a series element, which controllably manifests a high impedance, to regulate the current delivered by each respective supply. After the regulating portion of the circuit, each portion of the current is rectified by the rectifier portion of the +12 V rectifier and regulator 32, or the rectifier portion of the −12 V rectifier and regulator 34, respectively. The output of each rectifier is smoothed by a filter 46, 48 and the output of each filter 46, 48 is conducted to an external connection for providing power, either individually or in parallel with a corresponding output as part of a master/slave interconnection. Also attached to the output of filters 46, 48 are voltage regulators 54, 56, respectively. These voltage regulators monitor the output voltage of the +12 volts supply and {the −12 V} supply, respectively; and each provides a feedback control signal 57, 59 to the controllable regulator element to regulate each respective output voltage.

Some of the current passing through the current sensor 40 is connected to a −5 V rectifier and regulator 36, which is part of the −5 V power supply 37. In series with the output of the −5 V rectifier and regulator 36, is a current sensor 42, which monitors the pulsating D.C. output current and voltage of the −5 V rectifier and regulator 36. A controllable impedance element, similar to the ones used in rectifier and regulators 32 and 34, is used to increase or decrease the amount of power transferred to the −5 V supply. After passing through the controllable impedance, the current is rectified into a pulsating D.C., which is further connected to a −5 V filter 50, to reduce the pulsations. The output of the −5 V filter 50 is connected to an external connection point for connection to electronic equipment and to a −5 V regulator 58, which monitors the −5 V power supply voltage level and also provides a control signal which is connected by lead 61 to a summing point 60 where it is summed with the output of the −5 V current sensor 42. The sum signal from summing point 60 is connected to the controllable regulator portion of −5 V rectifier and regulator 36. The −5 V power supply 37 differs from the other supplies in that it does not have a feedback connection to summing point 41 of the PWM 18.

Also connected to the forward converter 26, by means of the power transformer 29, is a power system fault sensor 66, which performs two important functions. The first function is that of a peak detector which detects the peak level of the pulse-width modulated voltage delivered by the transformer 29 to the +5 V, 60 amp rectifier 30, and from this peak detected signal generates a power system fault (PSFS) data bit signal for warning the attached computer system via a line 68, whenever a power system fault occurs. The power system fault sensor 66 peak detects and averages the output of the power transformer 29 to generate a sensor voltage which is compared with a set reference level. When the averaged, peak detected voltage drops below the set reference level, the attached system is notified via the line 68 that insufficient voltage is being delivered to the +5 V, 60 amp power supply 31 portion of the circuit so that the attached system may execute whatever steps are possible to minimize data loses from the soon to follow power system fault. In a master/slave interconnected power supply, there will be two power system fault lines 68 and a fault indication on either may be used by the software of the attached system to either store all data and stop execution, or to shut off selected portions of the attached system in order to continue operation at a current level which can be supplied by only one supply.

The second function of the power system fault sensor 66 is to provide a diagnostic aid observable by the operator for indicating whether sufficient voltage is being supplied to the load across the +5 V, 60 amp supply 31 to maintain its portion of the power demand. This function is implemented with an indicator LED which is an important indicator especially when the two +5 V, 60 amp outputs are paralleled in a master/slave interconnection because it means that the unit is delivering current.

FIGS. 2A–2I and FIGS. 3A–3L together provide a schematic diagram of a PWM power supply unit which can operate as an individual unit, as a master unit, or as a slave unit. FIGS. 2A-2I primarily diagram the power input and the current control circuits of the power supply unit, and FIGS. 3A-3L primarily diagram the power supply output and voltage control circuitry.

Referring now to FIG. 2A, wherein is shown the schematic for the high level D.C. supply 9, standard A.C. line power is supplied to the power supply over lines L1 and L2 into the A.C. line filter 6. The output of the filter 6 is connected through protective fuse 7 to high level rectifier 8, which directly rectifies the filtered line voltage. The output of rectifier 8 is connected through negative temperature coefficient thermistors 101 and 102 which protect the high level rectifier from current overload during the initial charging of the capacitors in the high level D.C. filter 10. The output of the high level D.C. supply 9 is connected by a fuse 103 to the remaining circuitry. The high level D.C. supply 9 provides all the subsequent power requirements of the power supply unit 4.

Figure 2B:
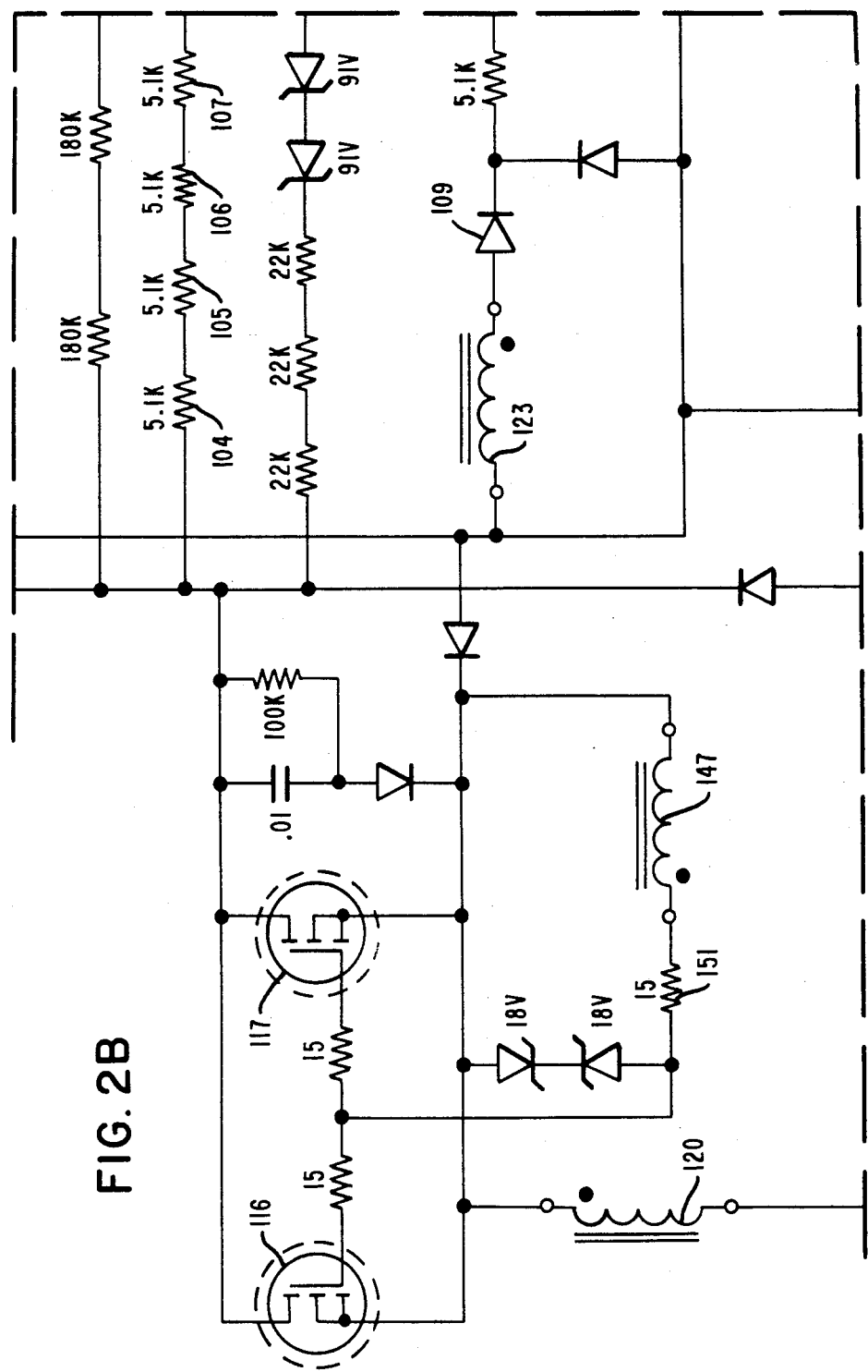
Figure 2C:
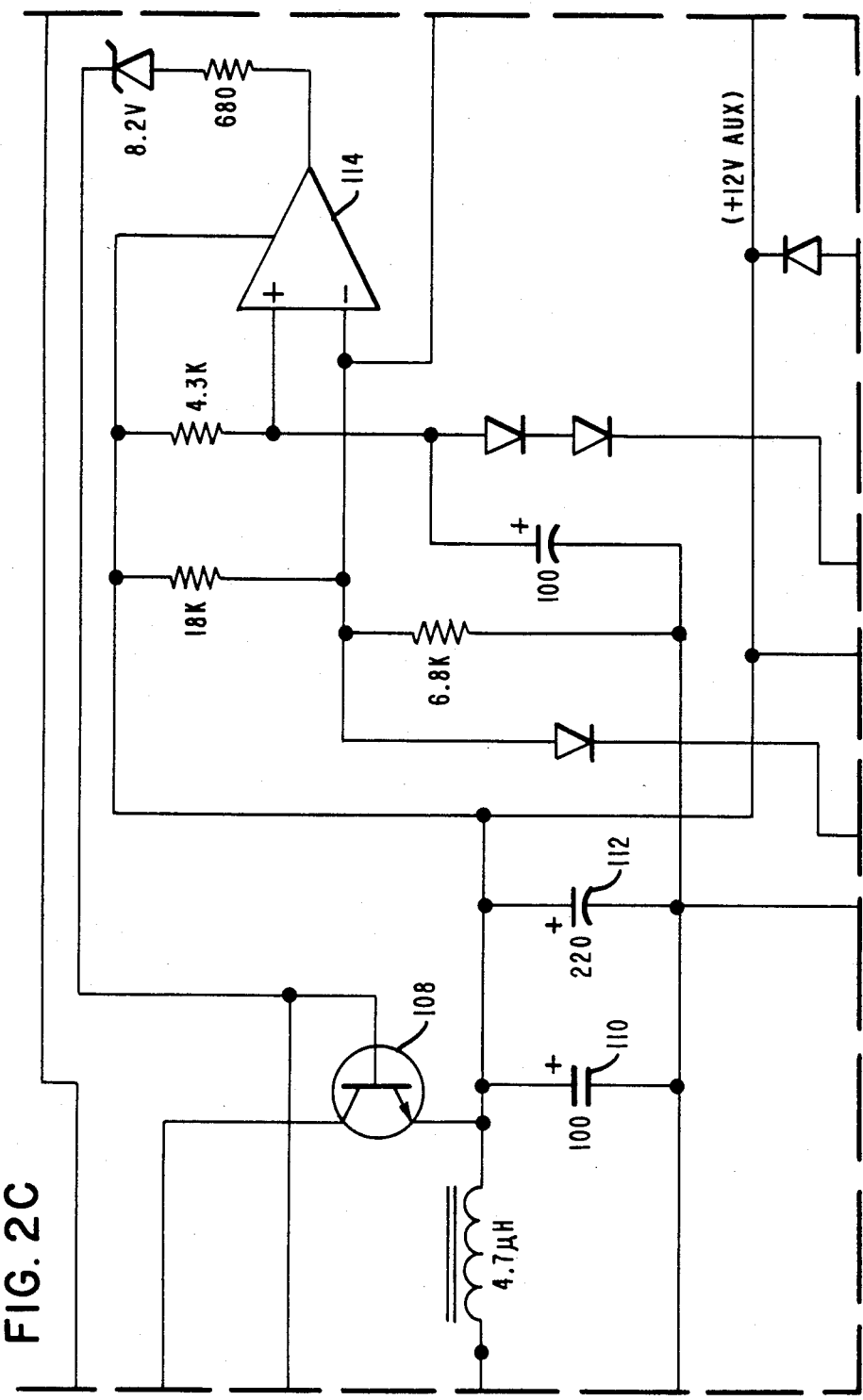
Figure 2D:
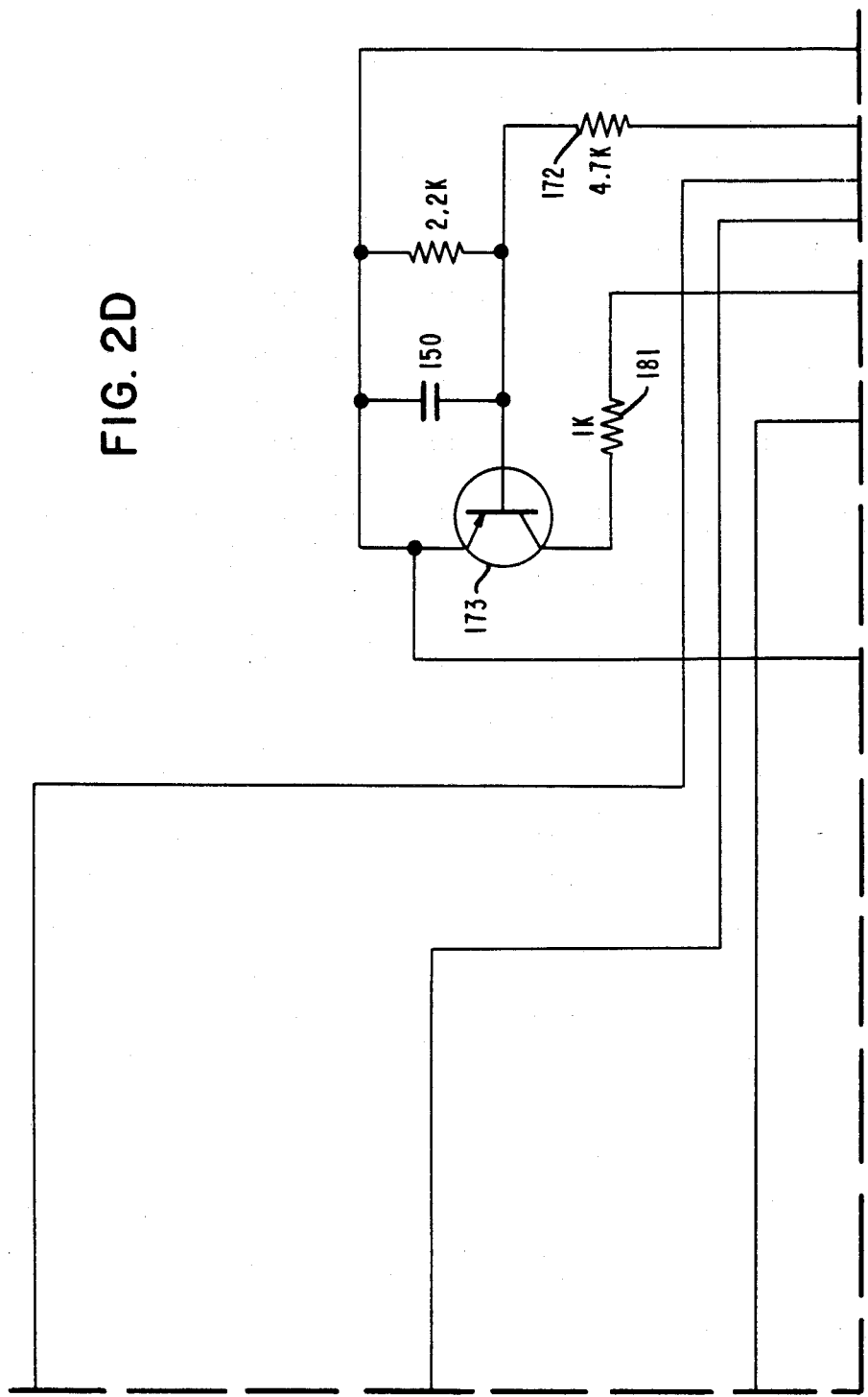
Figure 2E:
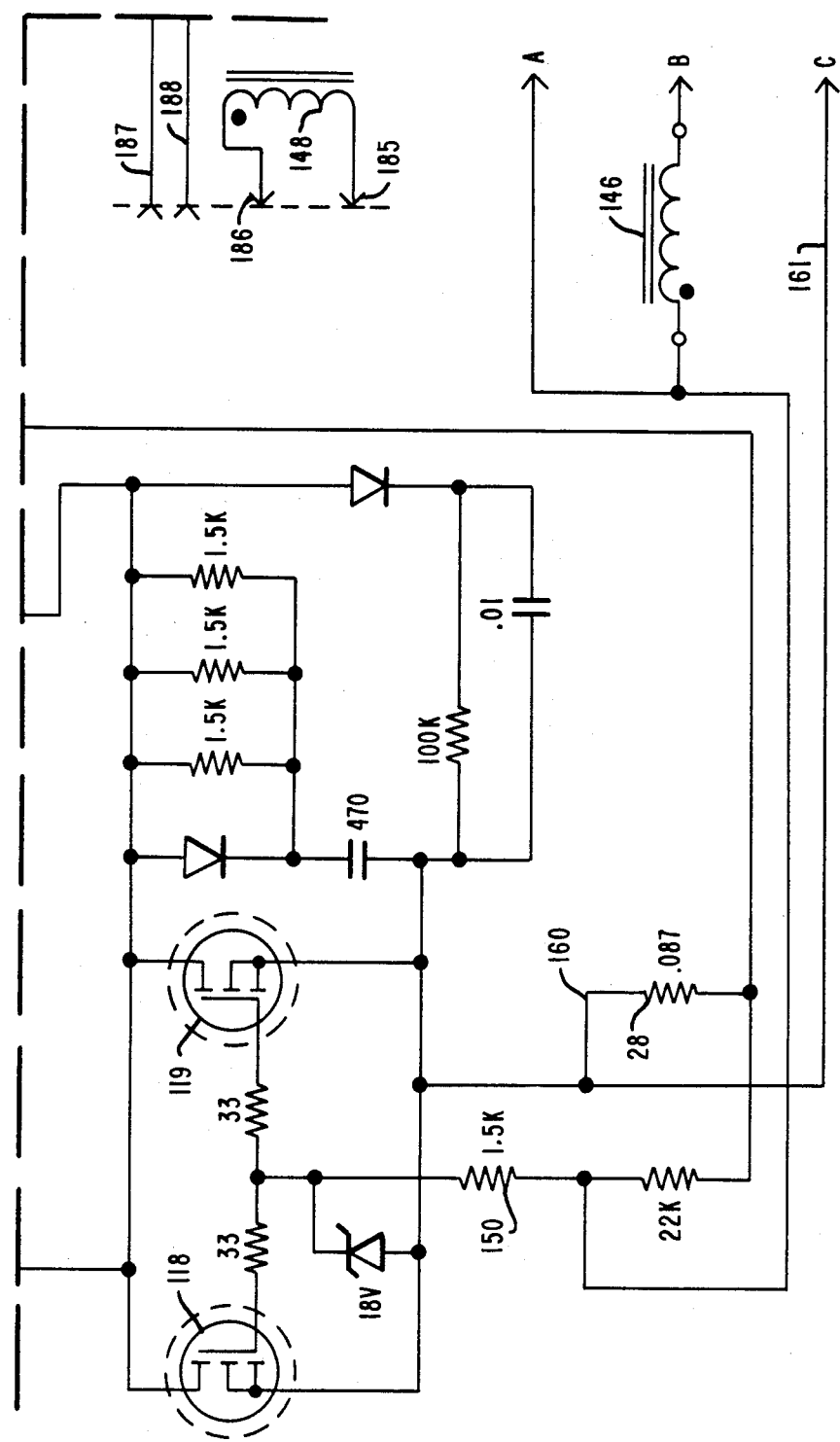

Referring to FIGS. 2B and 2C, the high level D.C. voltage of supply 9 is reduced by the dropping resistors 104, 105, 106 and 107 in series with regulating transistor 108 to charge up two storage capacitors 110, 112. Resistors 104-107 and a transistor 108 are start-up components which are necessary to bring the system up from an OFF condition, but once a steady state operating level voltage across capacitors 110, 112 has been achieved, an operational amplifier 114, connected as a comparator, reduces the voltage at the base of the transistor 108 to a level below the voltage of the emitter thereby turning the transistor 108 OFF. Before the transistor 108 is turned OFF, the forward converter transistors 116, 117, 118, 119 (shown in 2E) begin delivering power from a converter power transformer primary 120 to a mutually coupled, auxiliary power supply secondary 123. The secondary 123 is rectified by a diode 109 and filtered to supply the steady state +12 V auxiliary supply voltage across capacitors 110, 112.

Shown in FIGS. 2F-2I, the +12 V auxiliary voltage is connected to the VIN input to the PWM 18. The PWM 18 may be a Unitrode type 3842, which has an internal voltage regulator that provides a +5 V reference level at the output labeled VREF to a line 126. The precision timer 16, such as a type 555, is connected to the +5 V reference line 126 at the input labeled VC. The +5 V reference line 126 provides a stable, well regulated voltage supply for the timer 16 and is connected also through timing resistors 128, 130 and timing capacitor 132 to provide a stable charging voltage to the trigger input, TR, and the threshold input, THS, of the timer 16 to generate an approximately 50 kilohertz square-wave at its output. The output of the timer 16 is connected by a clock line 134 to the RTCT input of the PWM 18 and by a resistor 136, a transistor 138, and a resistor 140 to the inverting error voltage input of the PWM 18 (labeled —). These two inputs to the PWM 18 will provide a steady state output through a diode 141, a resistor 142, and a driver amplifier transistor 144 to a driver amplifier transformer primary winding 146 via the B labeled line (see FIG. 2E) and to an input resistor 150 of the forward converter transistors 118 and 119. The transformer primary winding 146 is mutually coupled to a secondary winding 147 and a tertiary winding 148. The secondary winding 147 is connected to an input resistor 151 of the forward converter transistors 116 and 117.

The forward converter transistors 116 and 117 each have their drains connected through the fuse 103 to the positive side of the high level D.C. supply 9, and their sources connected in parallel to one end of the forward converter transformer primary 120. Attached to the other end of the forward converter transformer primary 120 are the drains of the forward converter transistors 118 and 119, while the sources of the forward converter transistors 118 and 119 are connected through a current sensor 28 to the return side of the high level D.C. power supply 9. The output of the PWM 18 is amplified by the driver amplifier transistor 144, coupled to the forward converter transistors 116, 117 through the transformer windings 146, 147 and the resistor 151, and coupled to the forward converter transistors 118, 119 through the resistor 150. In this manner, the parallel transistors 116, 117 are connected with the transformer primary winding 120 and the parallel transistors 118, 119 in a push-push configuration, and this push-push forward converter is driven by the PWM 18 output through the driver amplifier transistor 144.

Referring now to FIGS. 3C, 3D, 3E, 3J and 3K; a secondary winding 121 and a tapped tertiary winding 122 are mutually coupled to the forward converter transformer primary winding 120 of FIG. 2B. One end of the secondary winding 121 is connected to a rectifier diode 202. The cathode of the diode 202 is connected to an input of a choke 204 and the output of the choke 204 is connected to the parallel combination of filter capacitors 206, 208, 210 and 212. The other end of the secondary winding 121 is connected to the other end of the parallel capacitors 206, 208, 210 and 212. The output across the capacitors 206-212 is the main output of the unit and it is brought out to external connection points as a +5 V, 60 amp power supply output.

Connected to the positive side of the +5 V, 60 amp supply is line 214 (shown in FIGS. 3B and 3E), which further connects to zener diode 216 that blocks the flow of current through a resistor 218 and through the base of a transistor 220 until the voltage across the zener diode 216 exceeds 5.6 V. If the voltage across the zener diode 216 exceeds 5.6 V, current begins to flow into the base of the transistor 220 which causes current to also flow through the collector of the transistor 220. The collector current of the transistor 220 is supplied through a limiting resistor 222 in series with an LED of an over voltage protection, (OVP) opto-isolator 224; causing the LED of the opto-isolator 224 to illuminate the photo-transistor portion of the opto-isolator 224 (shown at the bottom of FIG. 2F).

Figure 2F:
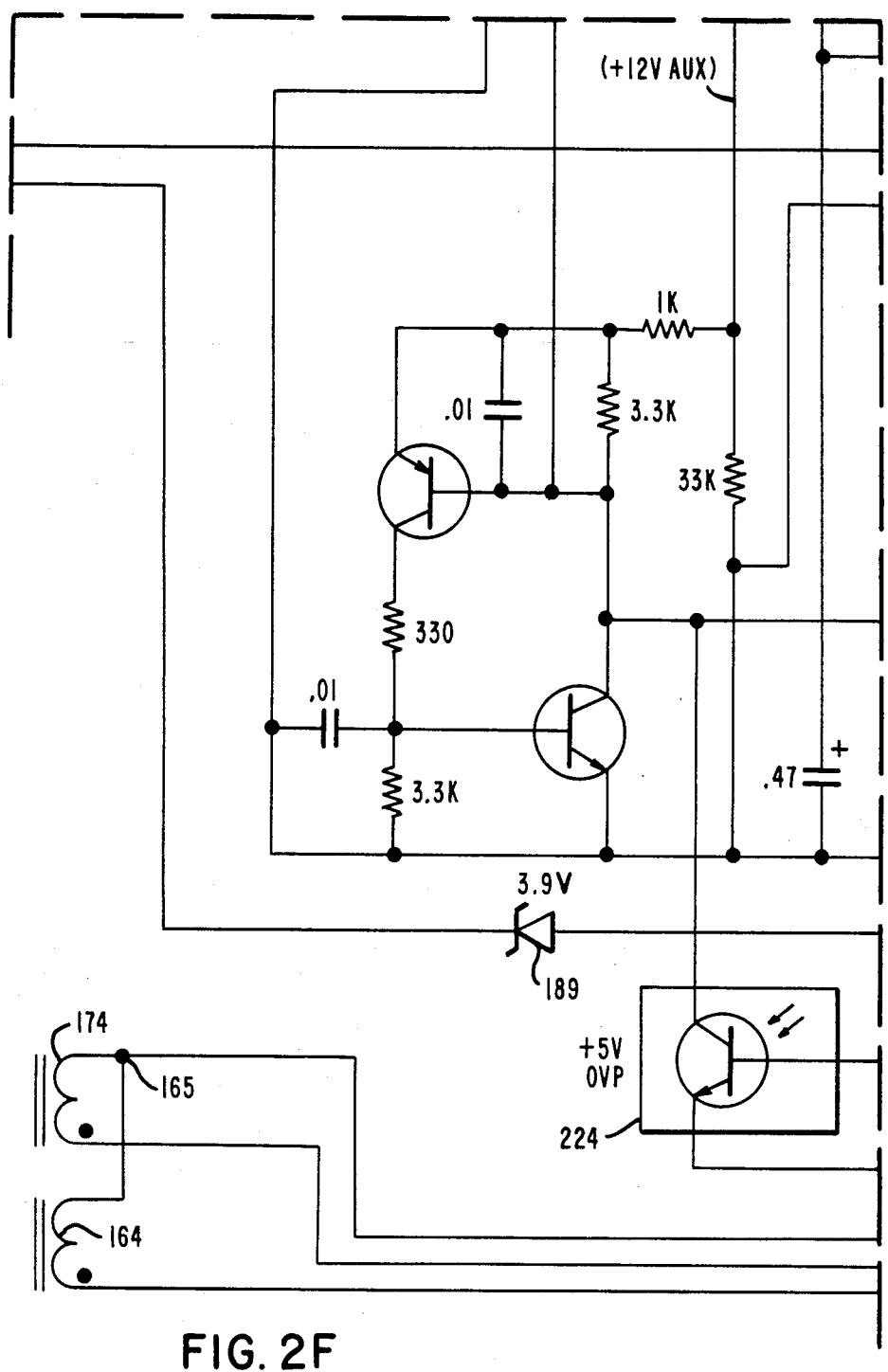
Figure 2G:
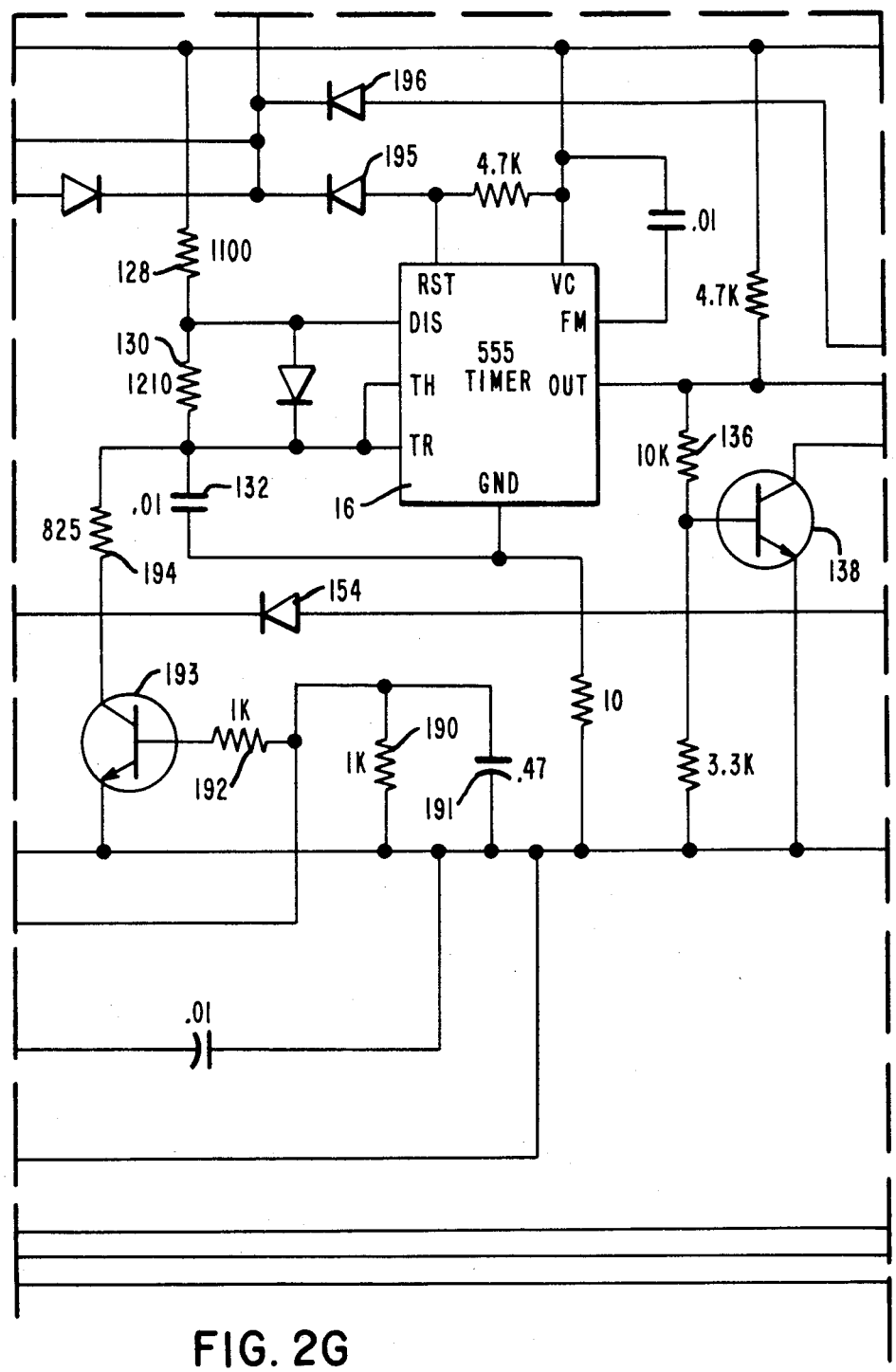
Figure 2H:
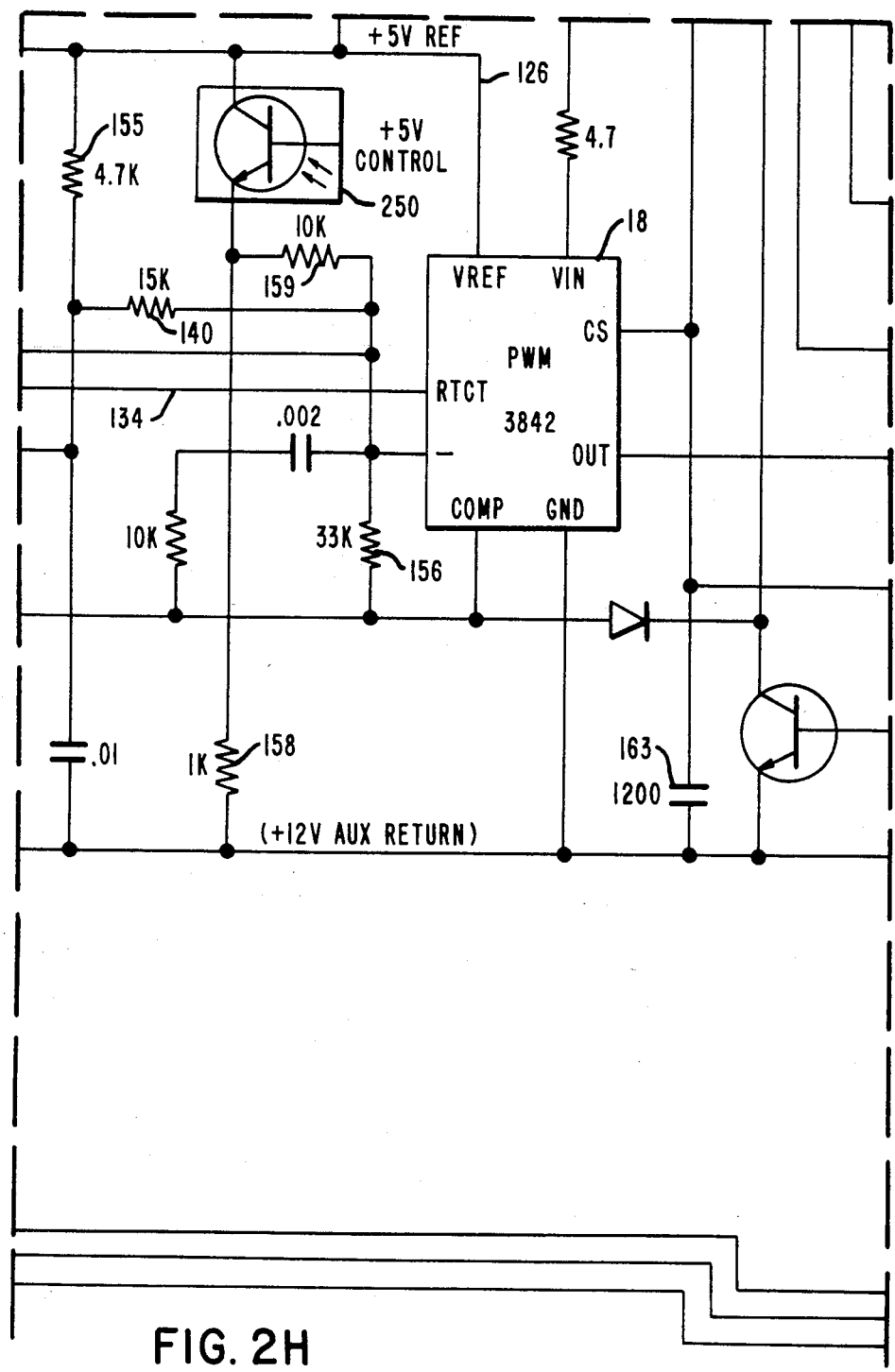

Referring now to FIG. 2F, 2G and 2H; the phototransistor of the opto-isolator 224 has its emitter connected to the return side of the +12 V auxiliary supply and its collector connected to a cathode of a diode 154. The anode of the diode 154 is connected to the compensation input, comp of the PWM 18. Thus, when the photo-transistor of the opto-isolator 224 is illuminated, it will sink current from the compensation input through the diode 154, pulling the voltage at the compensation input of the PWM 18 to a lower voltage, inducing, thereby, a shorter duty cycle pulse train to be outputted from the PWM 18 for driving the forward converter transistors 116-119. In the preferred embodiment, the combination of resistors 155, 140, 156 connected in series between the +5 V REF 126 and the compensation input of the PWM 18 acts as a pull-up resistor.

Referring to FIGS. 3A–3E, a half-wave power supply comprised of a diode 226, a resistor 227, and a capacitor 228 provide power and voltage to a 2.5 V reference 229, op amps 230, 231 and, a voltage regulator 232, such as a standard type 723. Also connected to the terminal 225 of the secondary 121 is a diode 234 in series with a resistor 235 and a LED 236, and further in series with a capacitor 237. The other end of the capacitor 237 is connected back to the other end of the secondary 121 thereby completing the circuit. The juncture of the resistor 235 and the LED 236 is further connected to a resistor 238 in series with a resistor 239 and potentiometer 240, connected as a rheostat. The circuit is completed by connecting potentiometer 240 to the other end of the transformer 121. Potentiometer 240 is adjusted for a threshold value across itself and the resistor 239, which is compared by the op amp comparator 230 with the output of the 2.5 V reference 229 such that if the voltage across the secondary 121 should drop below the power system fault signal (PSFS) threshold, then the op amp comparator 230 will have a low output state pulling the voltage at the inverting input of the op amp comparator 231 down through the diode 241 causing base current to flow through the line 214, through the emitter-base junction of transistor 242 and the resistor 243. This turns the transistor 242 ON, and, according to known circuit principles, most of the +5 V present on the line 214 appears across the resistor 245 of the series combination of the resistors 244 and 245. The voltage across the resistor 245 is connected by a line 246 to the attached computer system to provide the PSFS warning when insufficient voltage is supplied to the secondary 121 of the forward converter transformer.

The voltage across the capacitor 228, the 2.5 V reference 229, the power system fault signal op amp comparators 230, 231, and voltage regulator 232 is also supplied from the +12 V supply, which shall be discussed below, through a diode 247, which is the steady state mode of operation. The voltage regulator 232 operates from the voltage across capacitor 228 applied to the input VC and generates a control voltage at VO across a resistor 248 in series with a LED portion of an opto-isolator 250. The inverting error input, labeled (−) of the regulator 232 is connected through a resistor 251 to the +2.5 V reference 229, while the non-inverting error input, labeled (+) is connected to a voltage divider comprised of a resistor 252, a resistor 253 and a potentiometer 254 connected as a rheostat. This voltage divider is connected between the +5 V line 214 and the +5 V return. Adjusting the potentiometer 254 changes the non-inverting error input voltage and thereby adjusts the output voltage, VO, across the combination of the resistor 248 and the LED of the opto-isolator 250. Once the voltage across the LED of the opto-isolator 250 has exceeded its TURN ON voltage, current will flow through the LED causing it to give off illumination. As the output voltage of the voltage regulator 232 increases, the current through the resistor 248 and the LED of opto-isolator 250 likewise will increase thereby increasing the amount of illumination.

Referring now to FIG. 2H, the transistor portion of the opto-isolator 250 has its collector connected to the +5 V reference line 126 and its emitter connected through a resistor 158 to the +12 V auxiliary return. Also connected to the emitter of the opto-isolator 250 is a series resistor 159 which is further connected to the inverting error input of the PWM 18. Thus, as described in the previous paragraph, as the +5 V, 60 amp voltage increases, the photo-transistor of opto-isolator 250 is caused to increasingly conduct, thereby, raising the voltage at its emitter. The increasing voltage across the resistors 158, 159 increases the inverting error input voltage to the PWM 18, inducing a reduction of the duty cycle of the pulse-width-modulator drive signal to the forward converters 116–119.

Figure 3A:
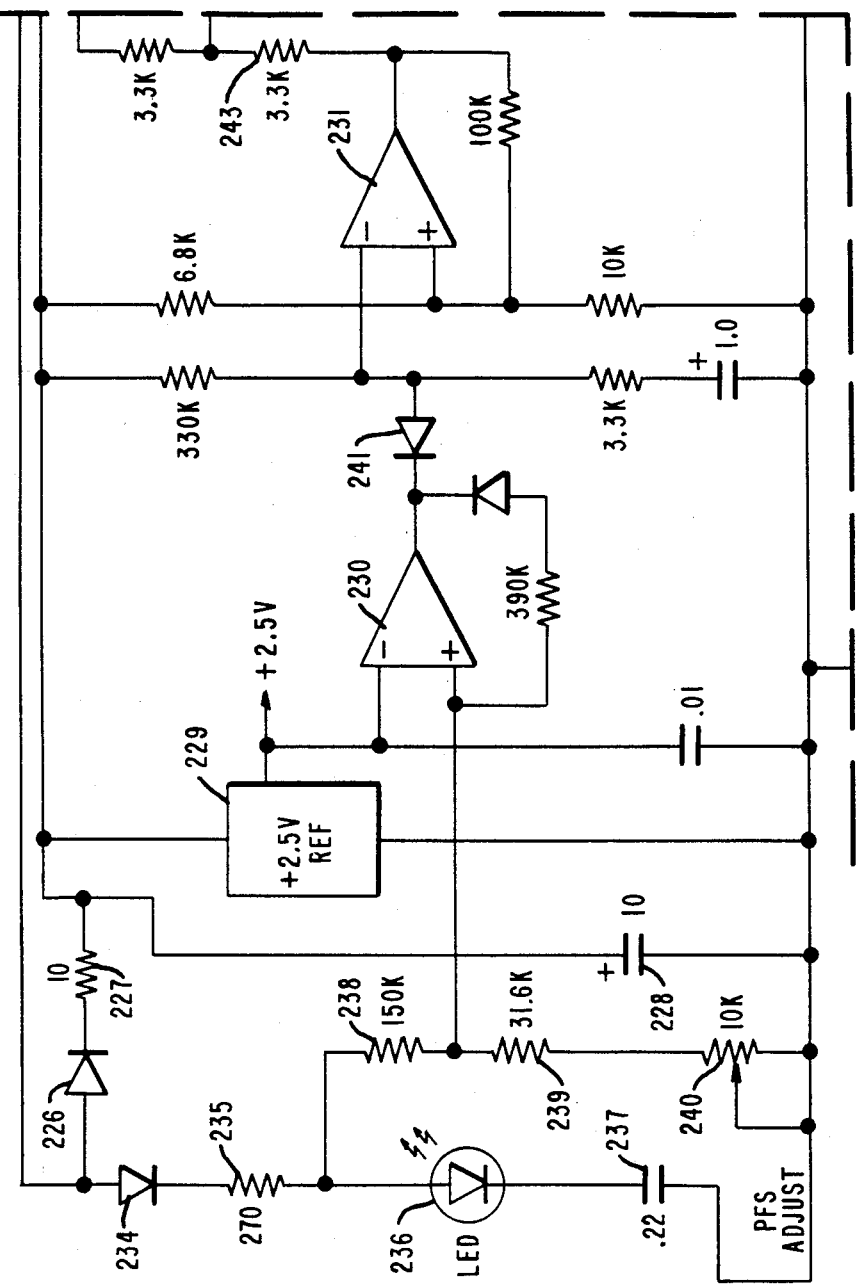
FIG. 3A–3L, when assembled according to the map of FIG. 3, form a simplified schematic of the power supply voltage output and output voltage control circuit portions of the invention.
Figure 3B:
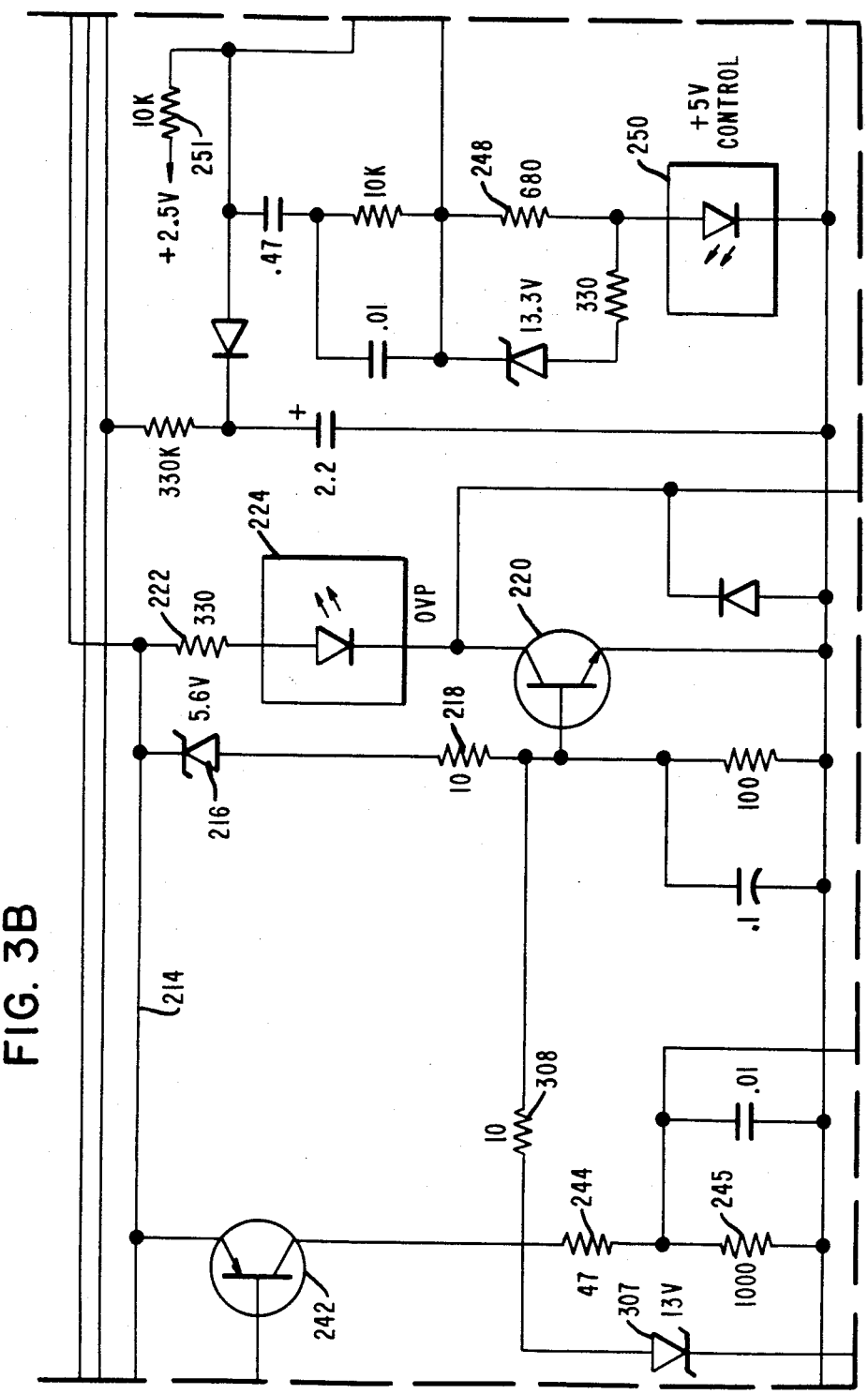
Figure 3C:
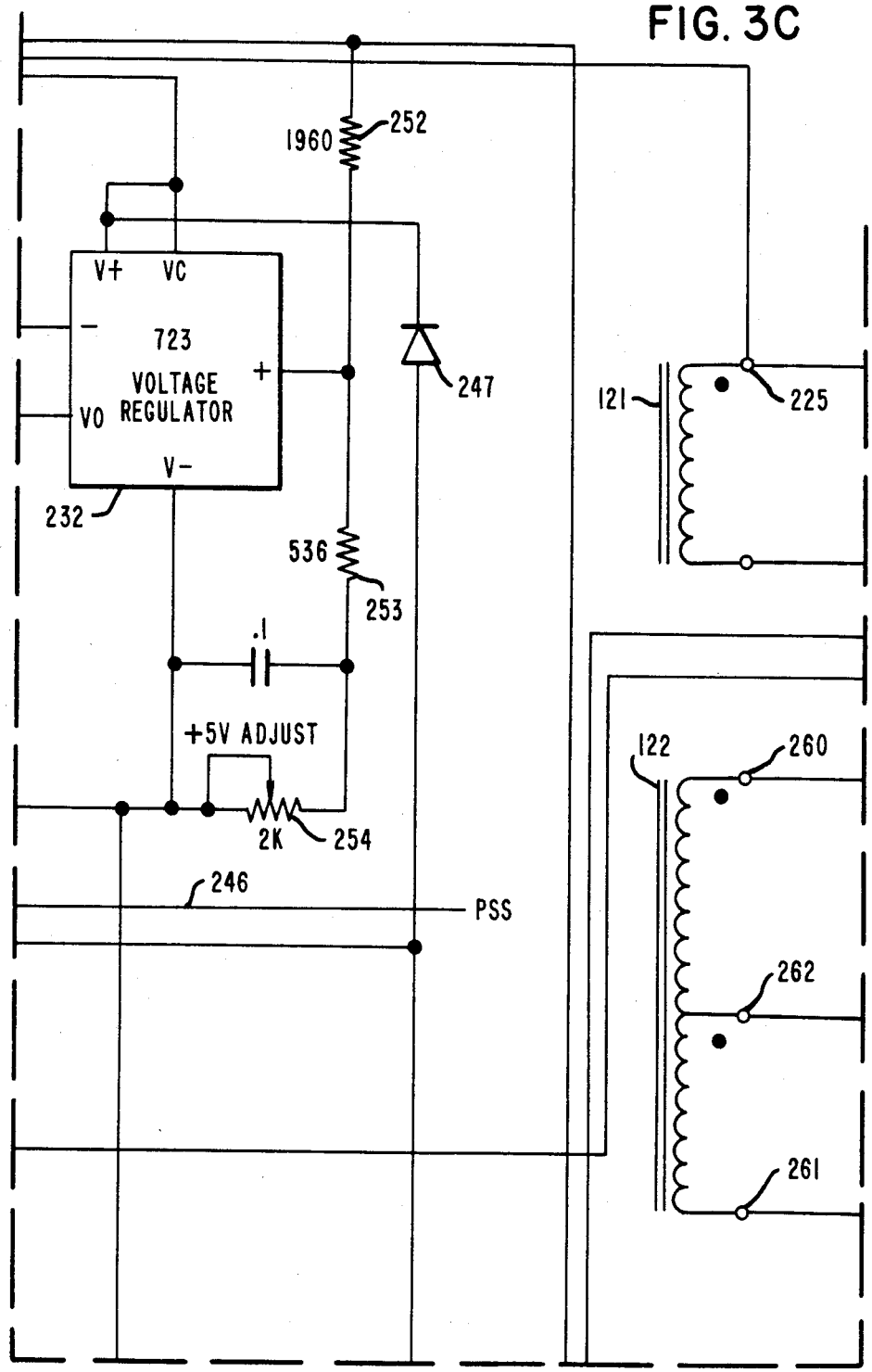
Figure 3D:
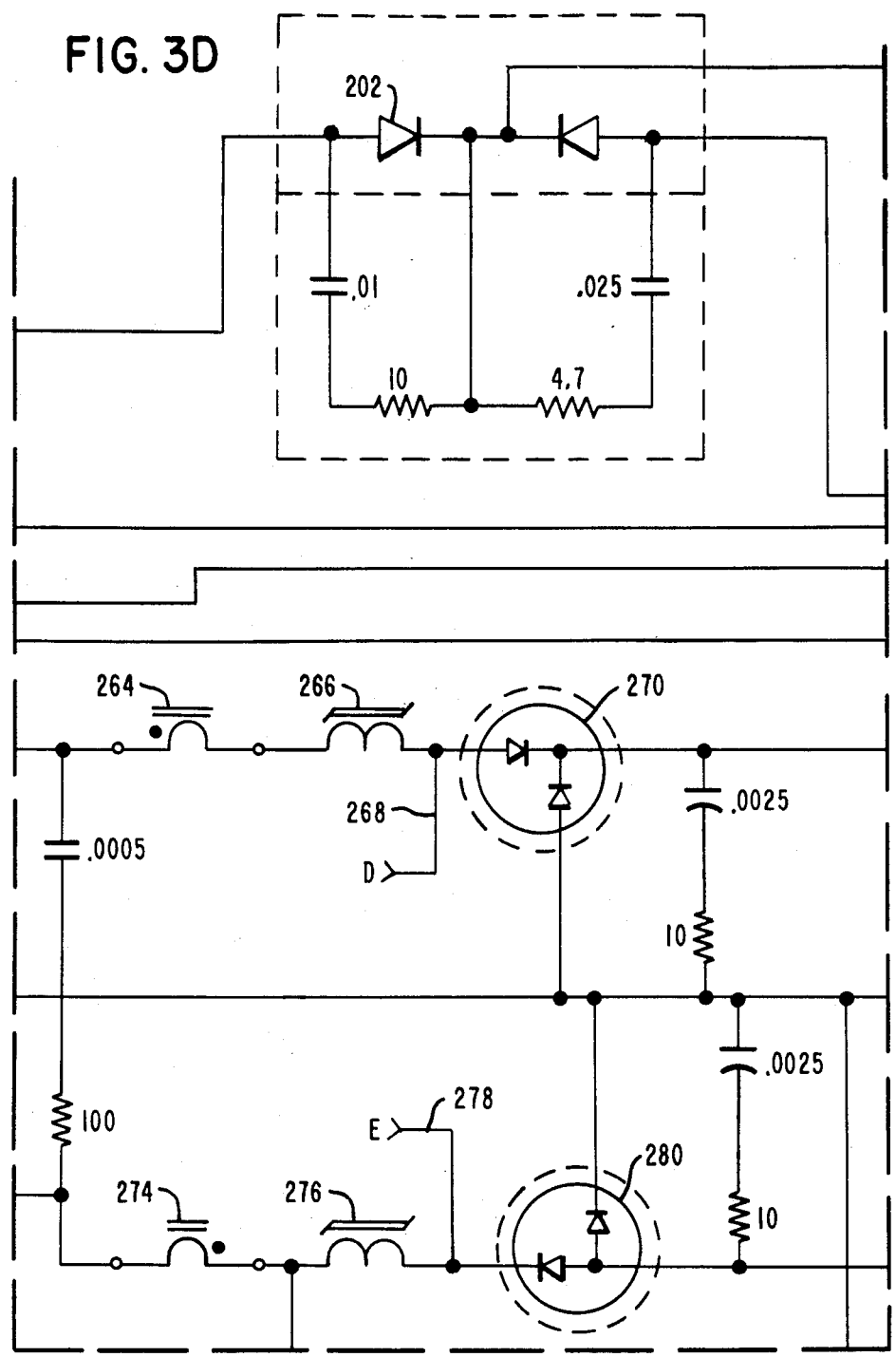
Figure 3E:
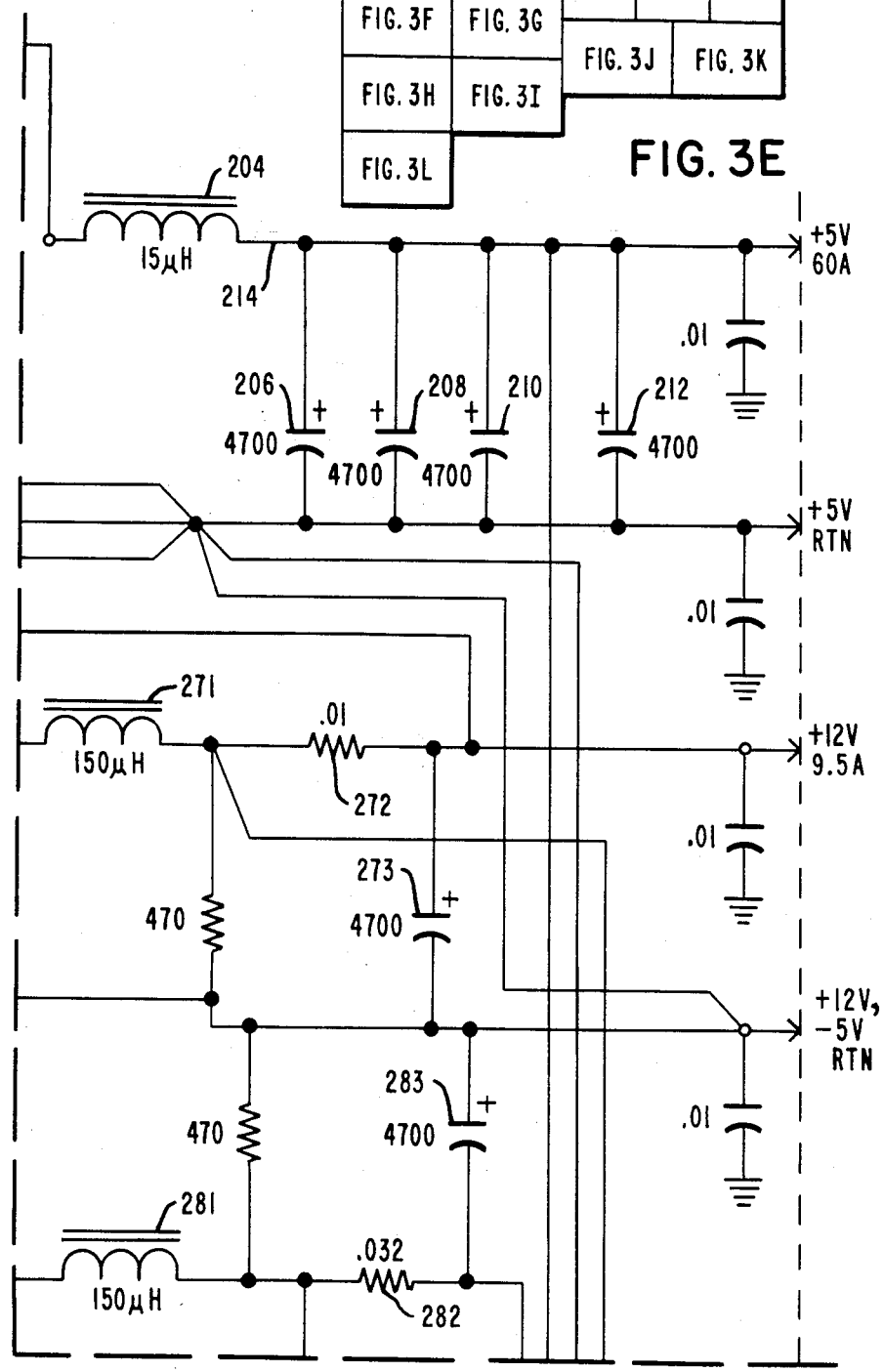
Figure 3F:
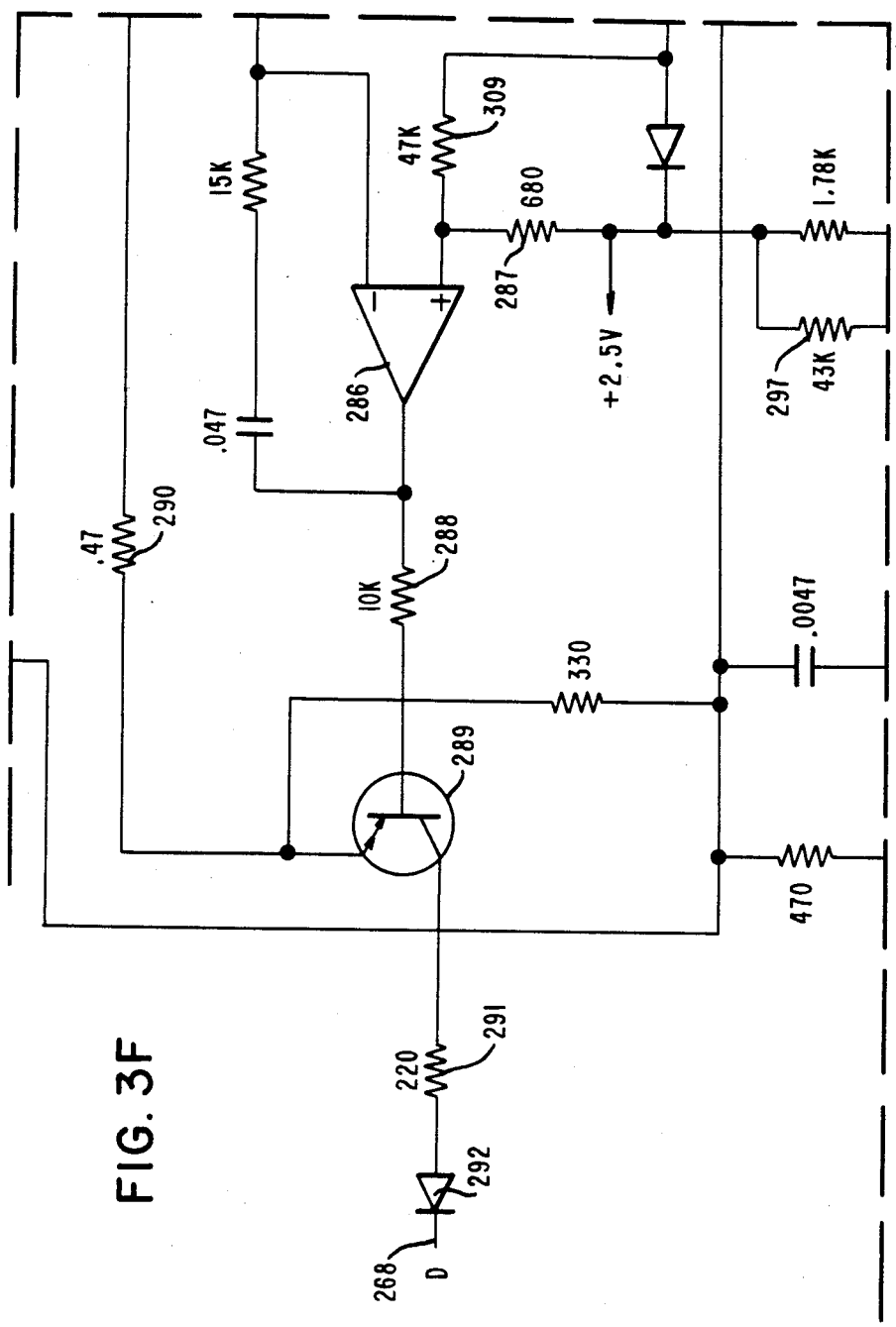

Referring now to FIGS. 3C–3E, a tertiary winding 122 of the forward converter transformer has a first end 260, a second end 261 and a center tap 262. Connected at the first winding end 260 is a +12 V current transformer, primary winding 264 which is further connected to a saturable reactor 266. The saturable reactor 266 is connected further to a +12 V reset line 268, at D, for controllably resetting the saturation level of the flux. An input of a diode combination 270 is connected to the output of saturable reactor 266. The output of the diode combination 270 is connected to a choke 271, a current limiting resistor 272 and a filter capacitor 273 that is then tied to the center tap 262 as a return. The +12 V output is taken across the filter capacitor 273, in a manner well known in the art.

Similarly, the secondary winding end 261 is connected to a −12 V current transformer primary winding 274 and further connected to a saturable reactor 276. The output of the saturable reactor 276 is connected to a −12 V reset line 278, at E, and also to a diode combination 280. The output of the diode combination 280 is connected to a choke 281, a limiting resistor 282 and a filter capacitor 283. The filter capacitor 283 has its other lead connected to the center tap winding 262 as a return. The −12 V output is taken across the filter capacitor 283, in a manner well known in the art. The return connection to the center tap 262 is further connected to the return of the +5 V, 60 amp supply as a reference.

Figure 3G:
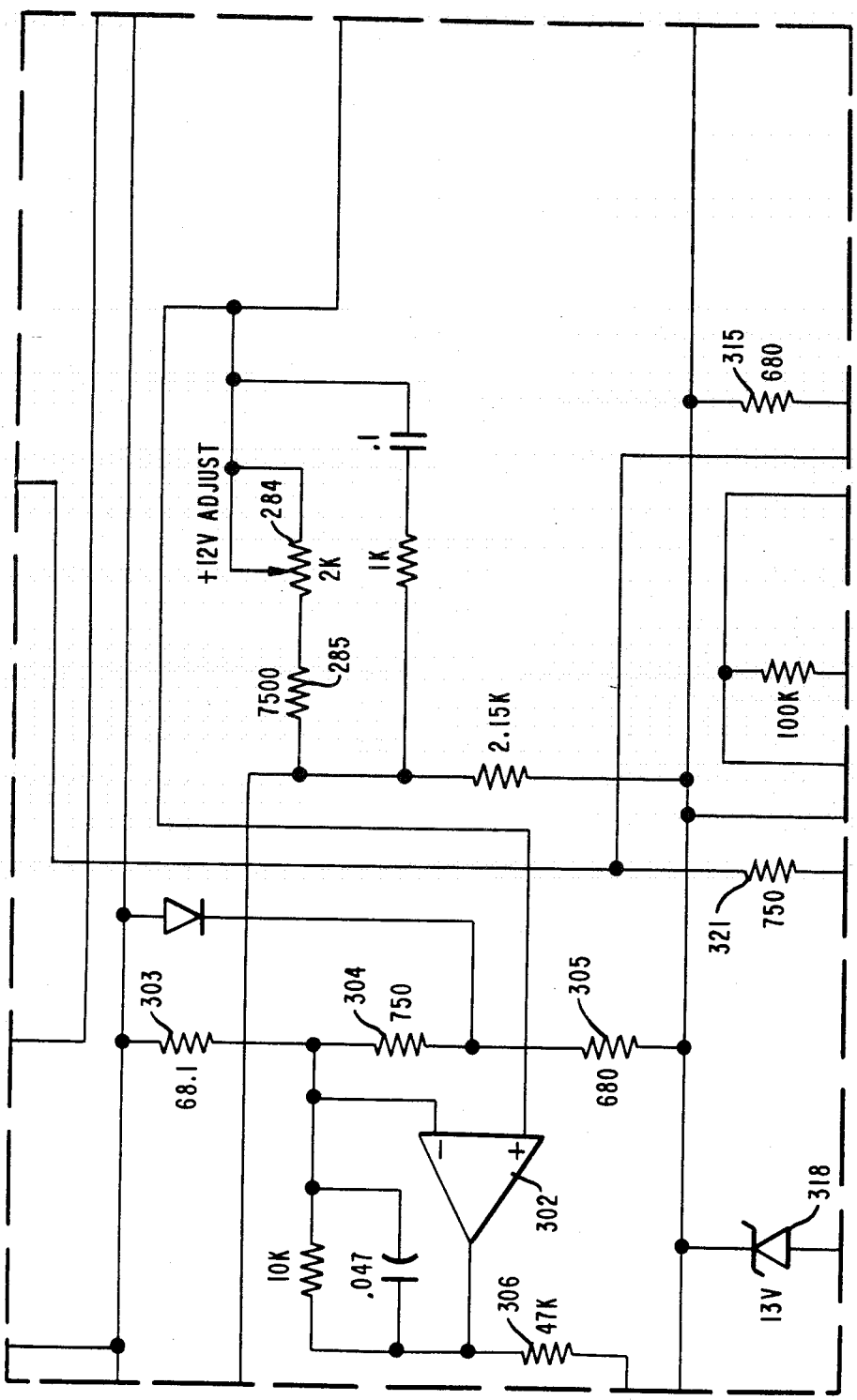
Figure 3H:
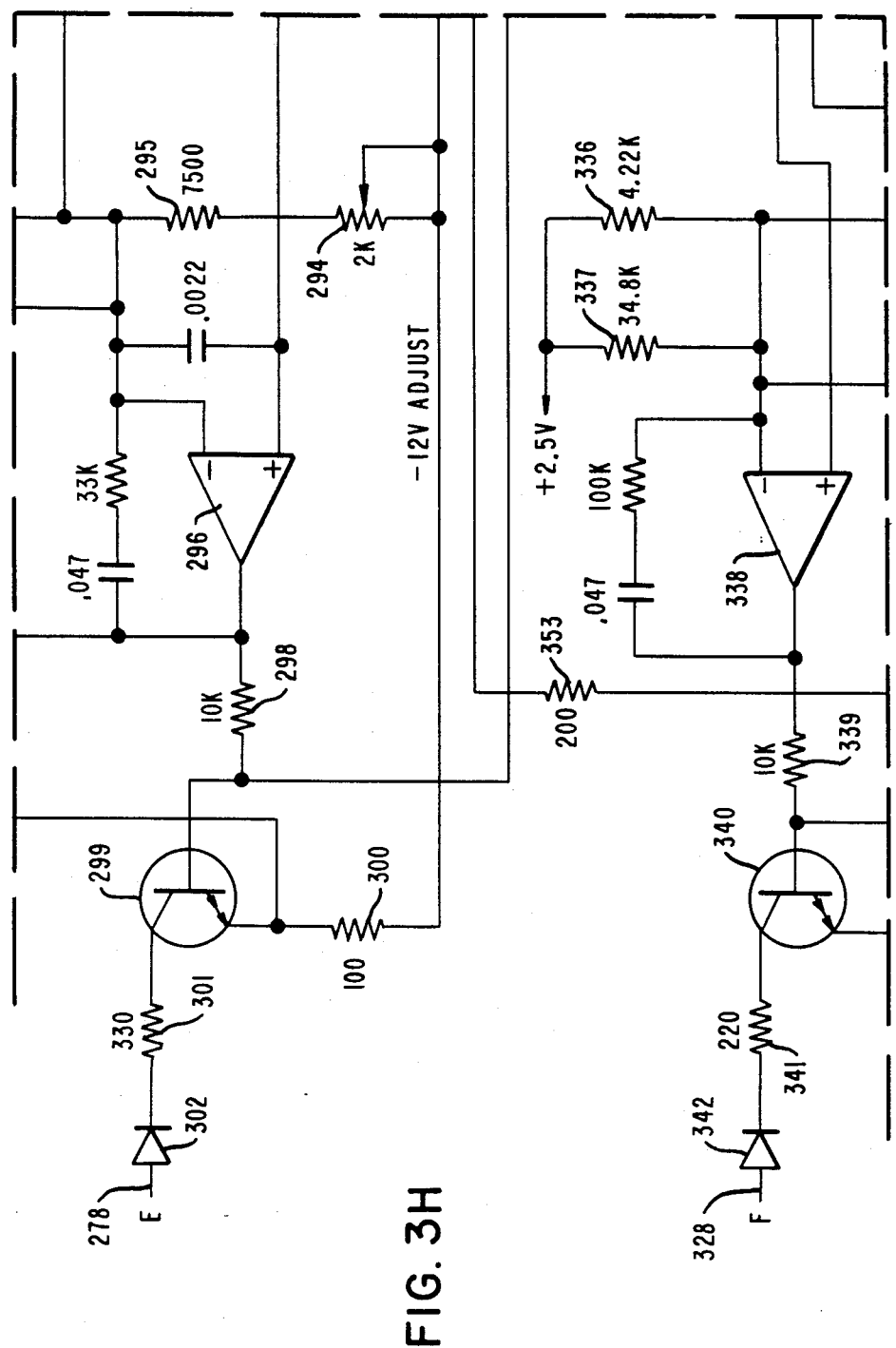
Figure 3I:
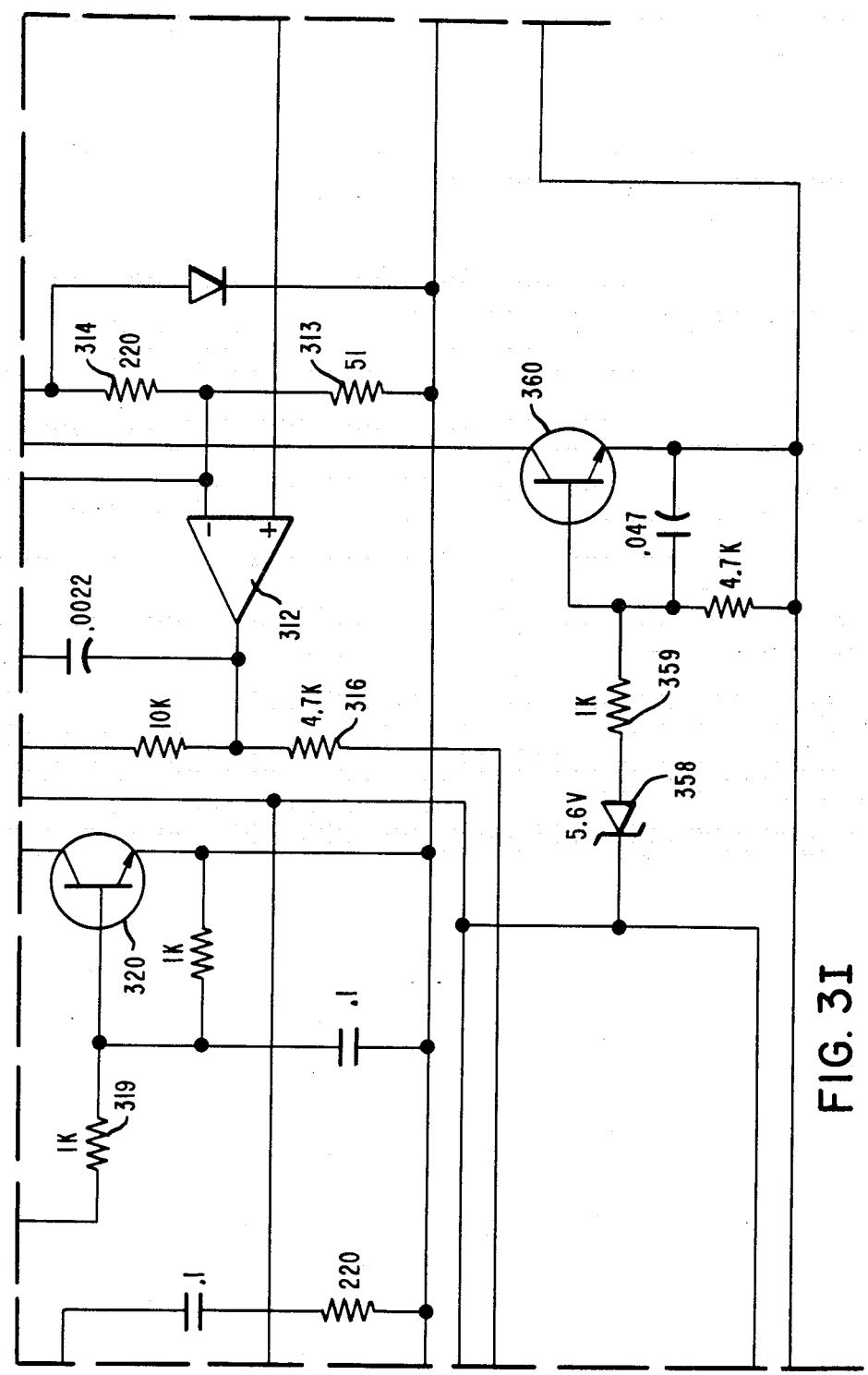
Figure 3J:
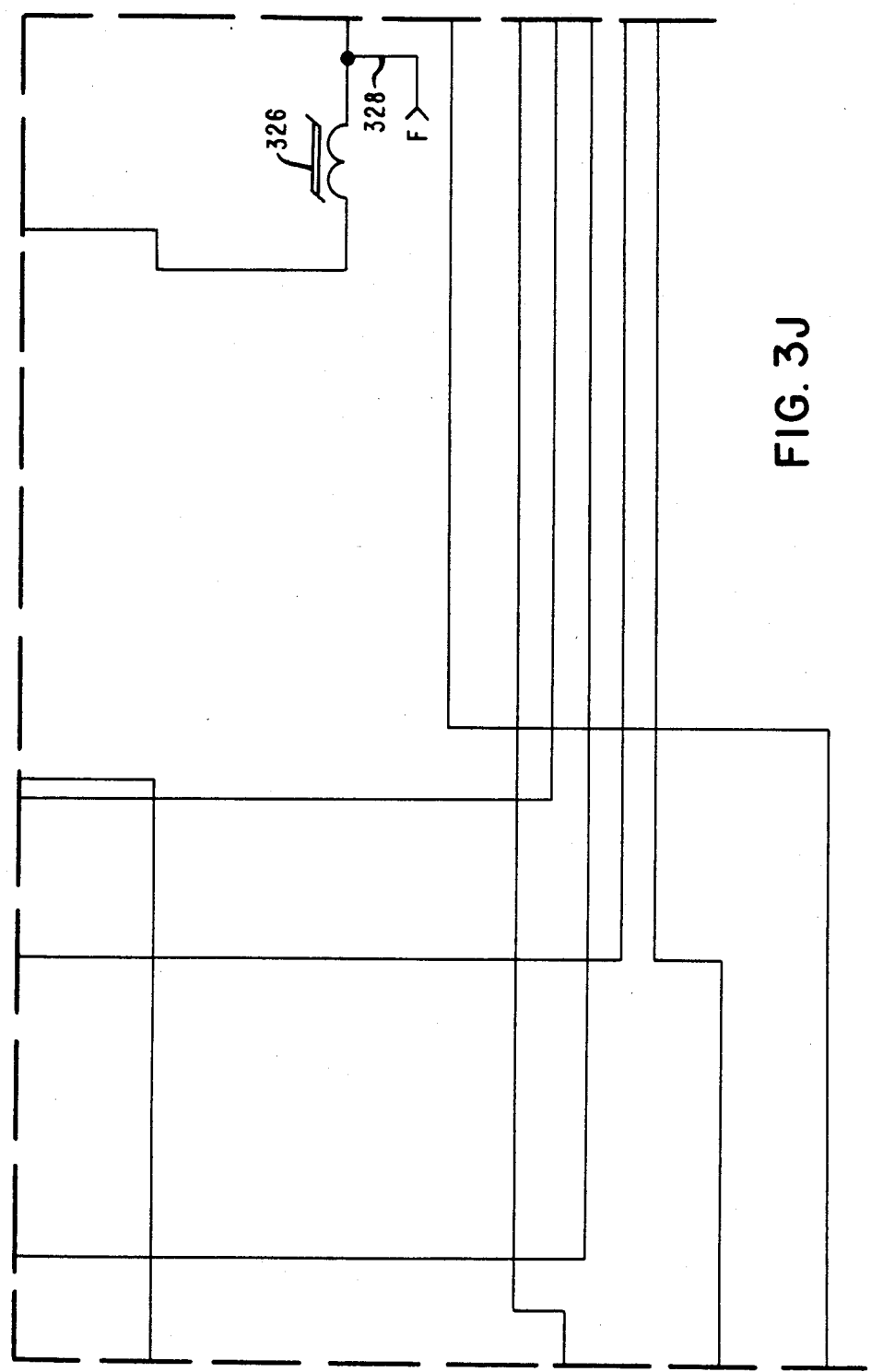
Figure 3K:
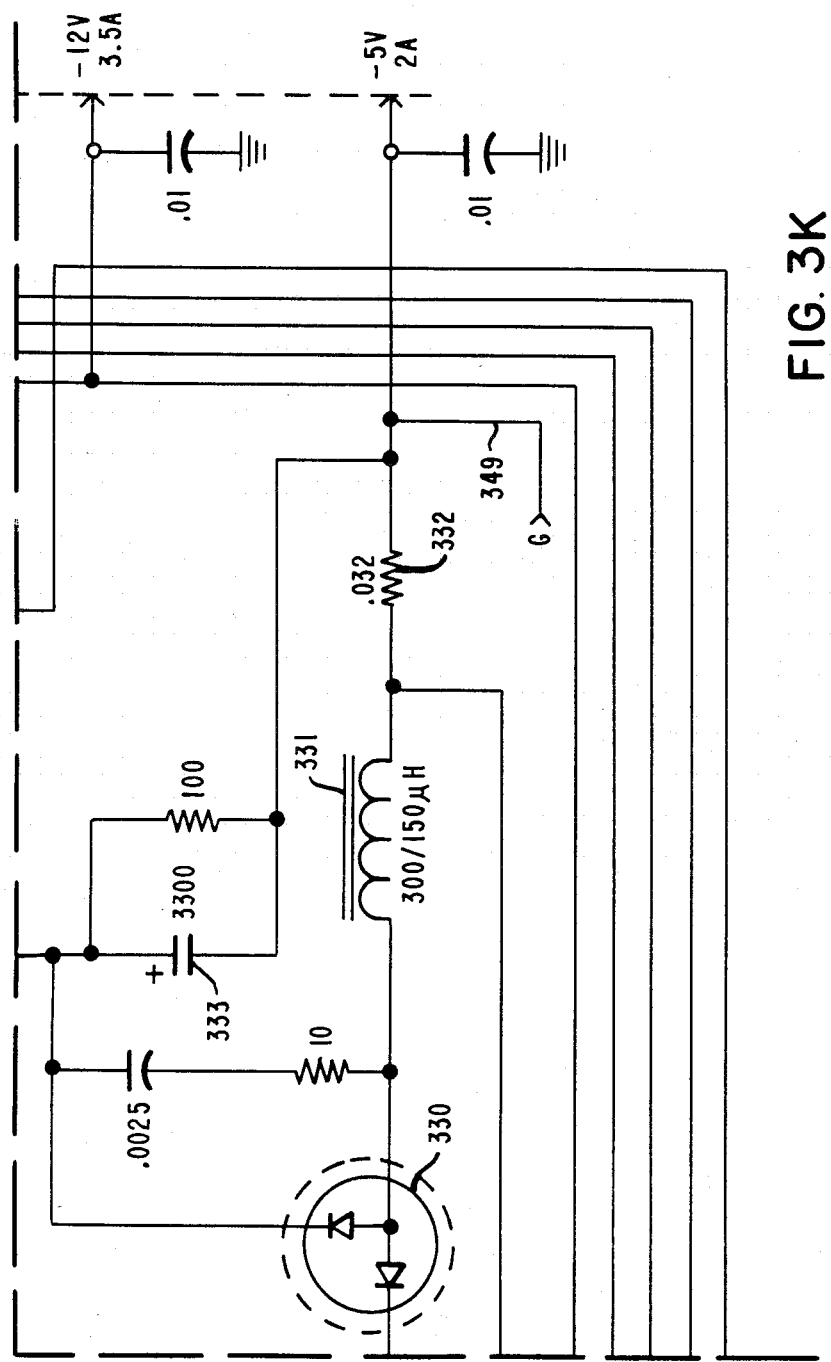
Figure 3L:
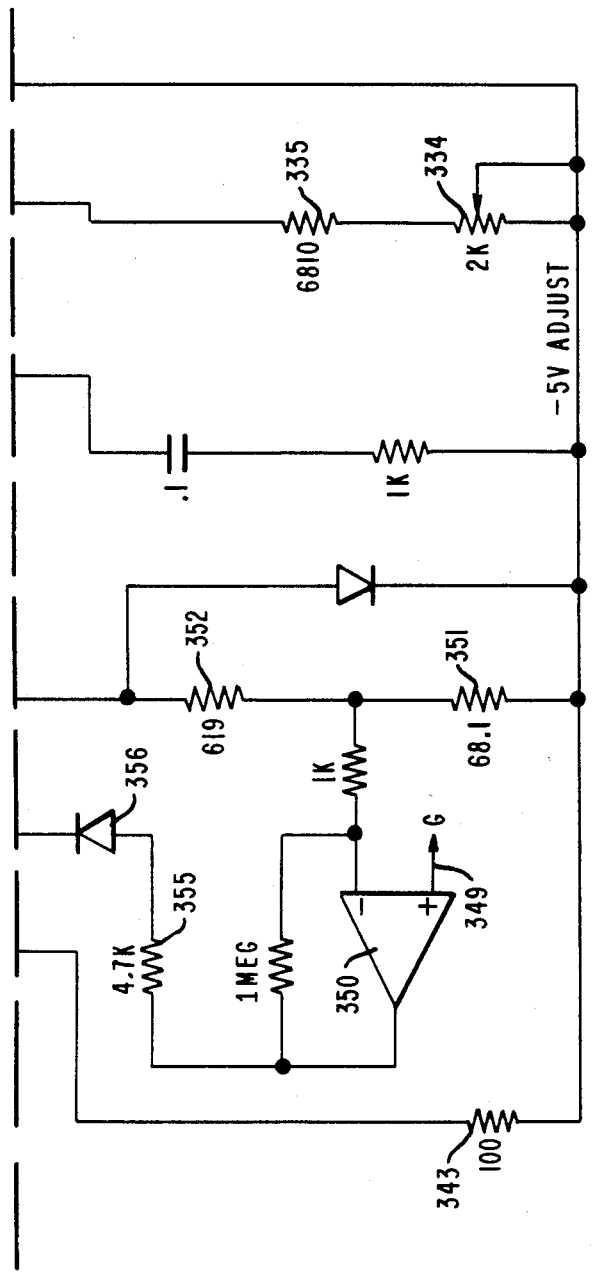

The positive output of the +12 V supply is connected to a potentiometer 284 which is in series with a resistor 285 (FIG. 3G). The resistor 285 is further connected to an inverting input of an op amp 286. The non-inverting input of the op amp 286 is connected through a resistor 287 to the +2.5 V reference supply 229. The output of the op amp 286 is connected through a resistor 288 to the base of a Darlington transistor driver 289. The emitter input of the Darlington transistor driver 289 is coupled through a limiting resistor 290 to the juncture of the choke 271 and the resistor 272. In this manner, when the diode combination 270 is not conducting, and the op amp 286 has determined the required adjustment of the +12 V power supply level from its input, the op amp output will be coupled through the resistor 288 to the base of the Darlington transistor driver and limiting resistor 290 causing current to flow out of the collector through a resistor 291, a blocking diode 292, and into a line 268; thereby providing a controlled reset current to flow through the circuit of the saturable reactor 266, the primary winding 264, and the tertiary winding 122. In an almost identical manner, the components 294 through 302 provide a controlled reset through the line 278 for the saturable reactor 276 back through primary winding 274 and tertiary winding 122, which for brevity will not be further detailed.

The output of the +12 V supply is also connected directly to a non-inverting input of an over voltage op amp 302 (FIG. 3G). The +12 V supply output is compared with a reference voltage tapped off from a voltage divider made up of the resistors 303, 304 and 305. If an over voltage is sensed by this comparison, then the output of the op amp 302, through the resistors 306 and 309, will cause the op amp 286 to send a maximum amount of controllable reset current to saturable reactor 266 in order to insert the greatest amount of controllable impedance in series with the power supplied from the forward converter winding 122. As a further over voltage protection measure, a zener diode 307 (FIG. 3B) will conduct when the voltage at the juncture of the choke 271 and the resistor 272 exceeds 13 V, allowing current to flow through a resistor 308 and through the base-emitter junction of the transistor 220. This will cause the transistor 220 to conduct collector-emitter current and cause the LED of opto-isolator 224 to illuminate, which, in turn, will have the same effects on the PWM 18, as discussed previously with regard to the +5 V, 60 amp, over voltage protection.

In a very similar manner, the components 312–316 (FIGS. 3G, 3I) provide maximum reset control to the saturable reactor 276 in the event of an over voltage condition of the −12 V supply. Likewise, similar over voltage protection for the −12 V is provided by zener diode 318 in series with resistor 319, which, when the juncture of the choke 281 and the resistor 282 exceeds 13 V, conducts current through the base-emitter junction of a transistor 320 causing current to flow from the collector to the emitter of the transistor 320. This in turn, draws current from the +5 V supply through the resistor 222, the LED of opto-isolator 244 (FIG. 3B), and resistor 321 causing the LED of opto-isolator 224 to illuminate and control the PWM 18 as discussed previously. Since the over voltage protection circuitry of the −12 V supply functions operate almost identically to that of the +12 V supply, further details are omitted for brevity.

Referring now to FIGS. 3C–3L, the −5 V, 2 amp supply will be described. A −5 V saturable reactor 326 is connected to the juncture of the −12 V current transformer primary winding 274 and saturable reactor 276. The other end of the −5 V saturable reactor 326 is connected to a −5 V reset line 328, labeled F, and also to diode combination 330. The output of diode combination 330 is connected to a swinging choke 331 which is further connected to a limiting resistor 332 and a filter capacitor 333. The other lead of the filter capacitor is connected to the center tap of the forward converter tertiary winding 122. The output across the filter capacitor 333 is brought out to an external connection for independent connection, or for paralleling when operating in a master/slave configuration.

The juncture of the swinging choke 331 and the limiting resistor 332 is connected to potentiometer 334 (FIG. 3L) which is adjusted to provide a predetermined reference voltage. The predetermined reference voltage in turn is divided by a voltage divider comprised of a resistor 335 and the parallel combination of a resistor 336 and a resistor 337. The divided reference voltage is then connected to the inverting input of an op amp 338. The output of the op amp 338 is connected through a resistor 339 to the base of a Darlington transistor driver 340. The non-inverting input of the op amp 338 is connected to the +5 V RTN. When the voltage out of the swinging choke 331, after being divided by the voltage divider attached to the inverting input of the op amp 338, becomes more negative than the non-inverting input, the op amp output will controllably drive current through the resistor 339 into the base of the Darlington transistor driver 340. This causes current to flow from the positive lead of the capacitor 333 (FIG. 3K), into the center tap 262, and out of the winding end 261 of the tertiary winding 122. From there, the current flows through the current transformer primary 274, the saturable reactor 326, a blocking diode 342, and a limiting resistor 341 via the F labeled line; to controllably reset the flux in the −5 V saturable reactor 326.

The −5 V supply also has an over voltage protection circuit, similar to those of the +12 V and −12 V supplies, which is comprised of a line 349, via the line labeled G, connecting the −5 V output with the non-inverting input of the op amp 350. The non-inverting input of the op amp 350 is divided down by a voltage divider comprised of resistors 351, 352 and 353 (FIG. 3C) and is connected between the +5 V RTN and the juncture of the swinging choke 331 with the limiting resistor 332 (see FIG. 3N). The inverting input of the op amp 350 is connected through a series resistor 354 to the juncture of resistors 351 and 352, as a reference input. When the non-inverting input is more positive than the inverting input, the op amp 350 drives current through the resistor 355, the diode 356, and into Darlington transistor driver 340. This induces maximum reset current through the saturable reactor 326 to controllably reduce the over voltage condition, in a manner similar to that discussed previously.

A further over voltage protection circuit has a zener diode 358 (FIG. 3I), with its cathode connected to the +5 V RTN, connected in series with a resistor 359 and the base-emitter junction of a transistor 360. This base-emitter junction is furhter connected in series to the juncture of the swinging choke 331 and the limiting resistor 332. If the emitter of the transistor 360 is pulled low enough to induce current to flow from ground through the base-emitter circuit, the transistor 360 collector-emitter circuit will saturate, pulling current through the resistor 222 (FIG. 3B) and the LED of opto-isolator 224 from the +5 V, 60 amp supply. This causes the LED of opto-isolator 224 to illuminate and controllably influence the PWM 18 in a manner similar to the over voltage protection circuits of the other supplies to reduce the duty cycle of the current pulses out of the forward converter transistors 116–119.

Figure 2I:
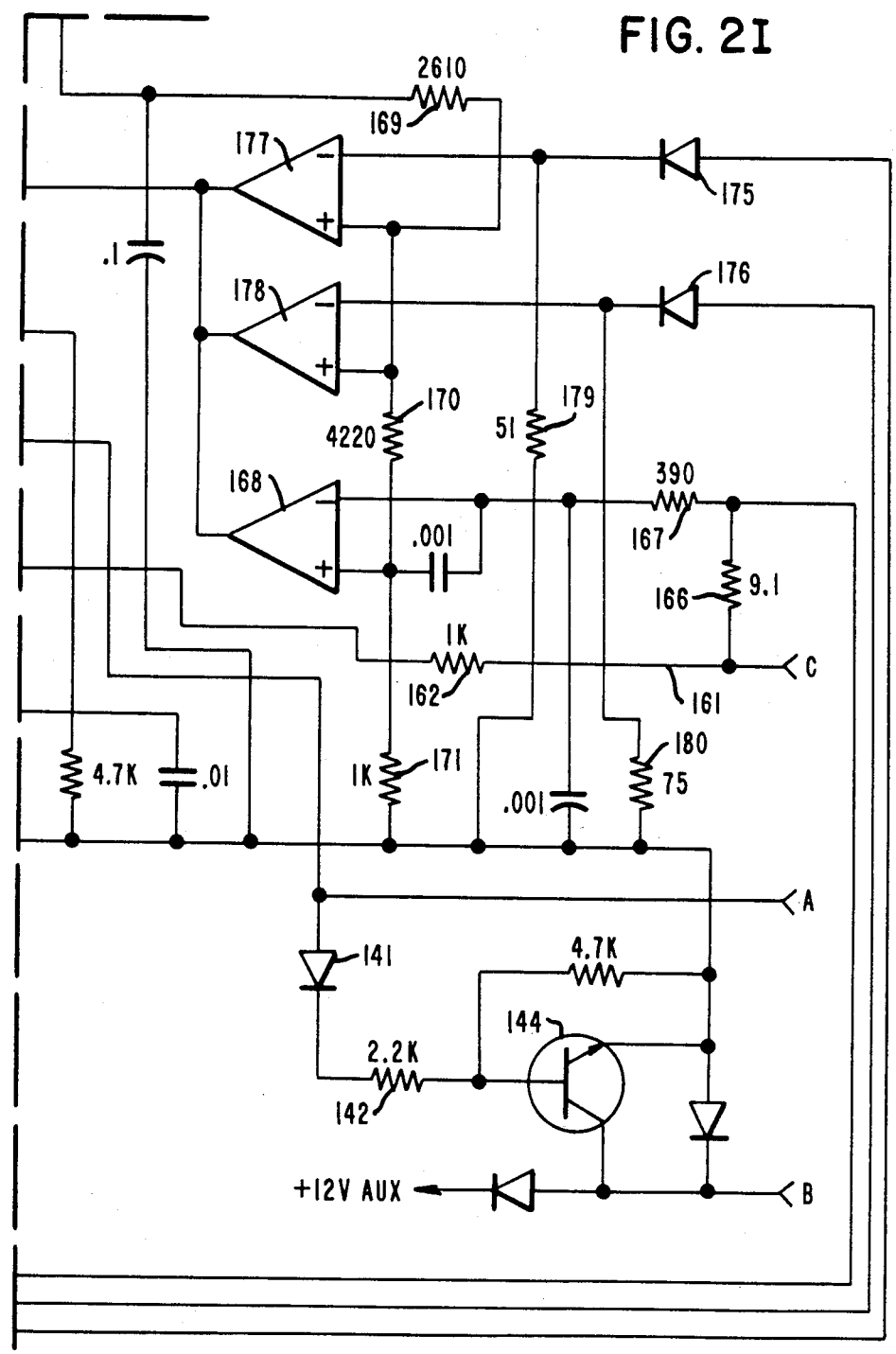

Referring now to FIGS. 2E–2I, the current sensing control portion of the circuitry will be described. Resistor 28 is connected in series with the forward converter transistors 116–119 and the high level D.C. supply 9. One end of the resistor 28 is connected to the return of the +12 V auxiliary supply, while the upper end 160 of the resistor 28 is connected through line 161 to a resistor 162 (FIG. 2I). The other end of resistor 162 is connected to the upper end of the capacitor 163, while the lower end of the capacitor is connected to the +12 V auxiliary return. Connected to the upper end of the capacitor 163 is the current sensing input CS of the PWM 18. Thus, as the current through the forward converter transistors 116–119 increases, the current also increases through resistor 28 causing the voltage across the resistor 28 at the point 160 to increase. The increased voltage is coupled through the resistor 162 and is stored in the capacitor 163. As the voltage across the capacitor 163 charges up, the PWM 18 is caused to reduce the duty cycle of the forward converter output. In this manner, an individual unit or either unit of a master/slave interconnection controls its own output from excessive current loads, such as a short circuit.

Since most of the power switched by the forward converter transistors 116–119 usually goes through the +5 V, 60 amp supply, it is necessary for the lower current +12 V, −12 V and −5 V supplies to have over current protection independent of the +5 V, 60 amp supply.

The current transformer primaries 264, 274 (FIG. 3D) are mutually coupled to current transformer secondaries 164, 174, respectively (FIG. 2F). These secondaries 164, 174 are arranged such that when one end of each is connected to a common point 165, the voltages and currents of the other two ends are in phase with each other. Although, because the currents and voltages are not identical, these voltages and currents will not be the same. The common point 165 is connected through a resistor 166 to shunt connecting line 161 (FIG. 2I). The common point is also connected to an inverting input of the op amp 168 through a resistor 167. The non-inverting input of the op amp 168 is connected by the series combination of resistors 169, 170 to the +5 V reference line 126 and also through resistor 171 to the +12 V auxiliary supply return line. Thus, the non-inverting input of the op amp 168 has a stable reference voltage supplied thereto from the voltage divider comprised of the resistors 169, 170, 171. Further, because of the low value of the resistor 166, this point will not vary significantly from the voltage across the shunt resistor 28. Thus, typically the op amp 168 has approximately 0.675 volt applied to its non-inverting input and approximately 0.5 volt or less connected to its non-inverting input. The output of the op amp 168 under such input conditions will be a high voltage. This output is connected through a resistor 172 to the base of a transistor 173, which since the emitter thereof is connected to the +5 V reference line 126, is typically in an OFF condition. However, a heavy current load in either or both current transformer secondaries 164, 174, such as would be experienced during a short circuit condition, will raise the voltage into the non-inverting input of the op amp 168 above that of the non-inverting input causing the op amp 168 output to assume a low voltage condition. This will pull base current through the resistor 172, causing the transistor 173 collector-emitter junction to turn ON. When the transistor 173 is in an ON condition, the resistor 175 conducts current and charges the capacitor 163 raising the voltage at the current sense input of the PWM 18 as the capacitor 163 charges. As the voltage at the current sensing input of the PWM 18 increases, the duty cycle of the forward converter current decreases to minimize the effects of a current overload condition.

In a similar manner, the non-commonly connected ends of secondary windings 164, 174 are connected through blocking diodes 175, 176, respectively, to respective inverting inputs of the op amps 177, 178. The non-inverting inputs of the op amps 177, 178 are connected together to the juncture of the resistor 169 and the resistor 170, thereby providing a division of the +5 V reference voltage across the series combination of resistors 169-171. The cathodes of diodes 175, 176 are connected to the +12 V auxiliary supply return through the resistors 179 and 180, respectively, which in the preferred embodiment are not identical because of the slightly unequal outputs of the two secondary windings 164, 174. As with the op amp 168, typically the reference voltage to each of the non-inverting inputs of the op amps 177, 178 is greater than the voltage supplied from the respective secondary 164, 174 through a respective diode 175, 176 to a respective resistor 179, 180 and the respective inverting input of op amps 177, 178. Thus, normally the outputs of the op amps 177, 178, which are at a high voltage, are connected together with the output of the op amp 168, through the resistor 172, to the base of the transistor 173. As discussed previously, if the voltage of one of the op amps 168, 177, 178 drops sufficiently to cause base current to flow through the resistor 172 and turn on the transistor 173, then collector current will flow through the resistor 181 and charge up the capacitor 163 thereby increasing the voltage to the connected current sense terminal of the PWM 18. As the voltage at the current sense terminal rises, the duty cycle of the power switched by forward converters 116-119 will be reduced in order to minimize the effects of the current overload sensed by current transformer secondaries 164, 174.

The previous description of the figures has assumed primarily either independent or master unit operation, even through the power supplies, the forward converter, the over voltage protection circuits and the over current protection circuits operate independently of such considerations, the remaining description will consider the operation of two units having their power supply outputs parallel and their control circuitry connected as a master/slave combination.

Referring to FIG. 2E-2I, as described previously, the output of the PWM 18 is connected through the resistor 142 to the driver transistor 144. The driver transistor 144 drives the primary winding 146 of the forward converter driver transformer. The secondary winding 147 (FIG. 2B) drives forward converter transistors 116, 117 and a tertiary winding 148 (FIG. 2E) has its two ends 185 and 186 brought out to an external connection point such as a keyed, multi-terminal connector. The signal available across terminals 185, 186 is the master output signal 25 (as shown in FIG. 1) and has the same duty cycle as the signal driving forward converter transistors 116-119. Also brought out to the same keyed, multi-terminal external connector are input leads 187, 188, shown in FIG. 2E, which correspond to the slave input 20 (as shown in FIG. 1).

In a master/slave combination, a two-wire cable runs from master output 185, 186 of one unit to the slave inputs 187, 188 of a second unit. During a positive portion of the master signal, after this signal reaches the zener voltage of the diode 189 (FIG. 2F), the signal will initially be further delayed by timing resistor 190 (FIG. 2G) and timing capacitor 191. After the short delay the current will be conducted through a resistor 192 into the base of a transistor 193, turning it ON. The collector of the transistor 193 is connected through the resistor 194 to the timing capacitor 132 at the timing input of precision timer 16 pulling that input low and causing thereby the output of timer 16 to a low state.

The line 187 is connected to the diode 195 which is connected to the reset terminal RST of the PWM 18. The line 187 is also connected through a diode 196 to the inverting error input of the PWM 18. During the negative portion of the master signal, diodes 195 and 196 will be forward biased which will pull the reset terminal of the timer 16 low, resetting its output to a low state, and putting a low state on the inverting error input of the PWM 18; thereby, causing the output of the PWM 18 to go to a high state.

Thus, the slave during the positive portion of the master signal, is allowed to freely respond until after the master signal exceeds the 3.9 V Zener level of diode 189 for a fixed delay time, which is inserted to compensate for the differences in the master and the slave switching times. The slave timing input will be forced to low state causing the timer output to a high state, which in turn, through the connection to the RTCT clock input of the PWM 18, causes the output to a low state.

During the negative portion of the input master signal, the slave timer is forced to a low output state by pulling the reset input of timer 16 low through the diode 195. This causes the output to assume a low state. Moreover, by pulling the inverting error input low through diode 196, the PWM 18 output is caused to assume a high state. Thus, the master input forces the slave PWM 18 to follow in lock step during the negative portion of the master signal.

Since the circuitry of each timer 16 in the master and the slave is substantially the same, and since during each cycle the reset terminal will force the timer 16 of the master and the slave into synchronization, it will be appreciated that even during the portion from 0 V up to the 3.9 V zener voltage, the slave will be substantially in lock step with the master signal. Therefore, a connection of a two-wire cable from terminals 185, 186 of master tertiary winding 148 to terminals 187, 188 of a slave unit, converts two otherwise identical switching power supplies into a master/slave pair which equally share the current load at twice the current capacity, with the only other interconnections required being the paralleling of the D.C. power outputs.

Moreover, those skilled in the art will recognize that if already connected in a master/slave combination, the master/salve relationship may be reversed simply by changing the two-wire connection to terminals 185, 186 from the former master to the former slave and changing the two-wire connection to terminals 187, 188 from the former slave to the former master. If terminals 185–188 are all mounted in a single, keyed, external connector, then the master/slave relationship could be reversed simply by reversing the ends of the interconnecting cable with the mating connectors thereof.

Thus, there has been described a new master/slave switching power supply system. While there has been shown what is considered to be the preferred embodiment of the invention, it will be evident that many changes and modifications may be made therein and without departing from the essential spirit of the invention. It is intended, therefore, in the appended claims to cover any and all such changes and modifications which do not depart from the true spirit and scope of the invention.

What is claimed is:

1. An apparatus for causing a plurality of switching power supplies of the PWM type to share a current output load by synchronizing the PWM switching control signals thereof, comprising:
   a first switching power supply having a PWM control circuit;
   at least one additional switching power supply having a PWM control circuit substantially identical to said first switching power supply;
   output interconnecting means for paralleling an output of said first power switching supply with a corresponding output of each additional switching power supply;
   means connecting said first switching power supply to each additional switching power supply for synchronizing each PWM control circuit in each additional switching power supply to said PWM control circuit of said first switching power supply; and
   means for reproducing at an output of each additional switching power supply PWM control circuit, a control signal substantially identical to an external output of said first switching power supply PWM control circuit;
   whereby each of the plurality of switching power supplies supplies a substantially equal share of the output current load.

2. An apparatus according to claim 1, wherein said connecting means comprises:
   a connector having a plurality of terminals mounted on each switching power supply;
   a first pair of said plurality of terminals electrically connected to an output of the PWM control circuit of the switching power supply said connector is mounted upon;
   a second pair of said plurality of terminals electrically connected to an input of the PWM control circuit of the switching power supply said connector is mounted upon; and
   a two wire cable connected to said first pair of said terminals at a first end and said second pair of said terminals at an other end.

3. An apparatus according to claim 2:
   said cable is connected to each power supply mounted connector at each end by a keyed, mating connector;
   said first end mating connector having mating terminals for connecting to said first pair of terminals;
   said other end mating connector having mating terminals to said second pair of terminals; and
   said first end and said other end can be interchanged, thereby interchanging the first power supply with one of the additional switching power supplies.

4. A master/slave switching power supply combination comprising:
   a first switching power supply;
   a second switching power supply substantially identical to said first switching power supply;
   a first PWM control circuit having an output and an output signal controlling a current output of said first switching power supply;
   a second PWM control circuit having an output and an output signal controlling a current output of said second switching power supply;
   a first external input connected to said first PWM control circuit;
   a second external input connected to said second PWM control circuit;
   a power output of said first switching power supply connected electrically in parallel with a corresponding power output of said second switching power supply; and
   a two-wire cable connecting the PWM control circuit output of one of said switching power supplies to the PWM control current external input of the other switching power supply forming a master/slave switching power supply which shares the current load supplied by said paralleled outputs.

5. A master/slave switching power supply according to claim 4 wherein reversal of the cable connections will render the former slave to the status of master and the former master to the status of slave.

6. A master/slave switching power supply according to claim 4 further comprising:
   a keyed, four-terminal connector mounted on each of said first and second switching power supplies;

a first pair of said four terminals is connected to said PWM control circuit output of the respective switching power supply upon which the connector is mounted;

the remaining pair of said four terminals is connected to said PWM external input of the respective switching power supply;

a first keyed, mating connector to said keyed, four-terminal connector, having a first pair of terminals cooperating with said first pair of terminals to connect said two-wire cable to one of said switching power supplies; and a second keyed, mating connector to said keyed, four-terminal connector having a second pair of terminals cooperating with said remaining pair of terminals to connect said two-wire cable to one of said switching power supplies;

whereby the switching power supply connected directly to said first keyed, mating connector is assigned the master current controlling function and the switching power supply connected directly to said second keyed, mating connector is assigned the slave function.

7. A master/slave switching power supply according to claim 6 wherein reversal of the first keyed, mating connector with the second keyed, mating connector reverses also the master/slave assignments of the switching power supplies.

* * * * *